United States Patent [19]
Hirano et al.

[11] Patent Number: 6,074,329
[45] Date of Patent: Jun. 13, 2000

[54] FLEXIBLE MANUFACTURING SYSTEM AND CONTROL METHOD THEREFOR

[75] Inventors: Hidekazu Hirano, Tokoname; Hiroyuki Takahara, Chiryu; Kazuo Machida, Kariya, all of Japan

[73] Assignee: Toyoda Koki Kabushiki Kaisha, Kariya, Japan

[21] Appl. No.: 09/216,708

[22] Filed: Dec. 21, 1998

[30]       Foreign Application Priority Data

Dec. 19, 1997   [JP]   Japan ................................. 9-351033

[51] Int. Cl.⁷ .............................. B23Q 3/157; B23Q 5/22; B23Q 7/14
[52] U.S. Cl. .............................. 483/15; 29/33 P; 29/563; 29/564; 198/346.1; 483/14; 483/31
[58] Field of Search .................. 483/14, 15, 31, 483/19; 29/33 P, 563, 564; 198/346.1

[56]             References Cited

U.S. PATENT DOCUMENTS

| | | | |
|---|---|---|---|
| 3,245,144 | 4/1966 | Kumari et al. ............................ | 29/563 |
| 3,909,922 | 10/1975 | Takasaki et al. ......................... | 403/31 |
| 4,309,600 | 1/1982 | Perry et al. . | |
| 4,443,927 | 4/1984 | Colonius et al. .................. | 29/33 P X |
| 4,697,318 | 10/1987 | Wickham et al. ...................... | 29/33 P |
| 4,747,193 | 5/1988 | Hashidate et al. ...................... | 29/33 P |
| 5,020,001 | 5/1991 | Yamamoto et al. . | |
| 5,054,175 | 10/1991 | Date ................. | 198/346.1 X |
| 5,149,024 | 9/1992 | Kawashima et al. . | |
| 5,310,396 | 5/1994 | Momoi et al. ............................ | 483/15 |
| 5,321,874 | 6/1994 | Mills et al. ................ | 29/33 P |
| 5,337,462 | 8/1994 | Hedman .................. | 29/33 P |
| 5,407,415 | 4/1995 | Spishak ..................... | 483/14 |
| 5,704,262 | 1/1998 | Baumbush et al. ...................... | 52/124 |
| 5,979,038 | 11/1999 | Nelson et al. ............................ | 29/563 |

FOREIGN PATENT DOCUMENTS

| | | | |
|---|---|---|---|
| 0 044 565 | 1/1982 | European Pat. Off. . | |
| 0 088 870 | 9/1983 | European Pat. Off. . | |
| 0 485 987 | 5/1992 | European Pat. Off. . | |
| 3722180 | 1/1989 | Germany ................................ | 29/563 |
| 0034485 | 3/1977 | Japan ..................................... | 29/863 |
| 81047 | 8/1984 | Japan ..................................... | 29/563 |
| 60-127959 | 7/1985 | Japan ..................................... | 29/563 |
| 191748 | 9/1985 | Japan ..................................... | 29/563 |
| 76257 | 4/1986 | Japan ..................................... | 29/563 |
| 36 1197151 | 9/1986 | Japan ..................................... | 29/564 |
| 404189455 | 7/1992 | Japan ..................................... | 29/563 |
| 7-24681 | 1/1995 | Japan . | |
| 10-86038 | 4/1998 | Japan . | |
| 1168378 | 7/1985 | U.S.S.R. .............................. | 29/563 |
| 1692815 | 11/1991 | U.S.S.R. .............................. | 29/564 |
| 1780991 | 12/1992 | U.S.S.R. .............................. | 29/563 |
| 2 191 026 | 12/1987 | United Kingdom . | |

*Primary Examiner*—William Briggs
*Attorney, Agent, or Firm*—Oblon, Spivak, McClelland, Maier & Neustadt, P.C.

[57]             ABSTRACT

Each of plural workpiece transfer units 10 input from on end of a machining line 100 in turn is fed toward the other end thereof in a first horizontal direction by a linear motor. In this transfer process, the workpiece transfer unit 100 is indexed to the front of predetermined some of plural spindle heads 60 arranged along the machining line 100, in turn. At an indexed position of the workpiece transfer unit 10, a workpiece supporting device movably mounted on the workpiece transfer unit 10 in two direction mutually perpendicular to the first horizontal direction, performs the machining operation on a workpiece in accordance with an NC program with respect to a tool T attached to a tool spindle 66 of the spindle head 60. At generally the same time when the workpiece transfer unit 10 starts a transfer feed toward the next spindle head 60 after finishing the machining operation by one of the spindle heads 60, the tool spindle 66 of the next spindle head 60 is started to rotate.

9 Claims, 20 Drawing Sheets

FIG. 11

MST

| WORKPIECE CLASSIFICATION NUMBER | MACHINING LINE NUMBER | | | | ... | Ln | PLANNING NUMBER | MACHINED NUMBER |
|---|---|---|---|---|---|---|---|---|
| | L01 | L02 | L03 | L04 | | | | |
| W01 | 70 | | | | | | 70 | 10 |
| W02 | 10 | 10 | | | | | 10 | 5 |
| W03 | | 50 | | | | | 50 | 12 |
| W04 | | | 70 | 70 | | | 140 | 18 |

FIG. 12

ULT

| | "TOP" UNIT | LOCATION | "NEXT" UNIT | LOCATION | "LAST" UNIT | LOCATION | "BUSY" |
|---|---|---|---|---|---|---|---|
| WAIT ST. | U20 | 00 | U21 | 00 | U22 | | |
| REPAIR ST. | U07 | 00 | U02 | 00 | | | |
| AGV1 | | | | | | | |
| AGV2 | | | | | | | |
| L01 | U05 | 10 | U06 | 02 | | | |
| L02 | U01 | 12 | U03 | 05 | U04 | 01 | 1 |
| L03 | U08 | 11 | U09 | 07 | U10 | 01 | 1 |

| WORKPIECE CLASSIFICATION | FORWARD MACHINING LINE | | | | | | BACKWARD MACHINING LINE | | | |
|---|---|---|---|---|---|---|---|---|---|---|
| W01 | 01 | 02 | 03 | 05 | N-1 | | | | | |
| W02 | 01 | 04 | 06 | 09 | | | N | 09 | 05 | |
| W03 | 01 | 03 | 05 | 07 | N-2 | | | | | |

MKT

FLEXIBLE MANUFACTURING SYSTEM AND CONTROL METHOD THEREFOR

BACKGROUND OF THE INVENTION

1. Field of the Invention

The present invention relates to a flexible manufacturing system and control method therefor, more particularly, to a flexible manufacturing system and control method therefor in which each of plural workpiece transfer units holding a workpiece to be machined thereon is input from one end of a machining line and output from the other end thereof in turn, and plural machining operations are performed to the workpiece by selectively coming into contact with plural cutting tools aligned along a longitudinal direction of the machining line.

2. Description of the Related Art

In a mass-production system for manufacturing a workpiece such an automobile part, there is conventionally adopted a transfer machine in which plural machine tools in which sole machining function is carried out are aligned along a machining line. However, there is recently adopted such a flexible transfer line (referred to as "FTL" hereinafter) of a type in which a plurality of machine tool having an automatic tool changer (referred to as "ATC" hereinafter) are disposed in the machining line instead of the machine tool with the sole machining function, in order to satisfy the need for flexibility so that different parts are machined in the same line.

In this FTL, it is so configured that the plural machine tools with the ATC are aligned along a direction for transferring a workpiece, and that the workpiece is transferred into each of these machine tools by a workpiece transfer device to perform a machining operation on the workpiece in turn. In such a FTL, there are independently provided the machine tools and the workpiece transfer device for transferring the workpiece between the machine tools. Further, in each of the machine tools, there is provided a workpiece fixing device for loading the workpiece or a pallet to which the workpiece is secured from each of the machine tools to the workpiece transfer device. To the contrary, the workpiece transfer devices are provided in generally the same number as the plural machine tools for transferring the workpiece from one machine tool to an adjacent machine tool.

Furthermore, the aforementioned machine tools with the ATC are so constructed that the variety of the machining operations are automatically continuously performed to the workpiece supported on a worktable by different cutting tools, or grinding tools each of which is selectively attached to a tool spindle. In this case, the ATC is used for releasing the used tool from the tool spindle and for attaching the other tool thereto, at the same time when the machining operation is completed by one tool. Moreover, a tool clamp mechanism is formed in the tool spindle for fixing the tool brought by the ATC to the tool spindle and for releasing the fixed tool therefrom.

SUMMARY OF THE INVENTION

In the conventional FTL described above, in a case that the tool change requirement is continually operated with respect to the tool spindle in each of the machine tools, the time period relating to the ATC including the start and the completion in the rotation of the tool spindle and the restart thereof will entail a considerable part of the operating time in the machine tool or in the FTL. This increases operating time, and to diminishes the performance of the FTL, i.e., the productivity therein.

Accordingly, an object of the present invention is to provide a flexible manufacturing system which is capable of eliminating a decline of the productivity resulting from a tool change.

In the conventional FTL, an automatic tool clamp mechanism is formed in a tool spindle provided in each of the machine tools, so that it is necessary to enlarge an outer diameter of the tool spindle and also that of a bearing for rotatably supporting the tool spindle. As a result, this renders it difficult to rotate the tool spindle at a high speed due to the unbalance of the tool clamp mechanism and to ensure the rotational accuracy of the tool spindle for a long time. This problems is made to be prominent in such a machining operation as in aluminum material in which the tool spindle is rapidly continually stopped and rotated for changing the tool rotated at a high speed (e.g., 20,000 rpm).

Accordingly, another object of the present invention is to provide a flexible manufacturing system which is capable of eliminating the aforementioned problems such as declines in the rotational accuracy, durability and the like resulting from each of the tool spindles in which the automatic tool clamp mechanism is provided.

Further, in the aforementioned FTL, the workpiece transfer devices for connecting the machine tools to each other are provided independently of each of the machine tools, and the workpiece fixing device is required not only in each of the machine tools but also in the workpiece transfer device, to load the workpiece or the pallet. Therefore, it is necessary to provide the workpiece transfer device and workpiece fixing device in generally the same number as that of the machine tools, so that it is difficult to reduce the cost of the manufacturing of the FTL.

Accordingly, the other object of the present invention is to provide a flexible manufacturing system, that is preferable to construct the FTL, which can omit not only the conventional workpiece transfer device specifically designed for transferring a workpiece between the machine tools but also a workpiece fixing device provided on each of the workpiece transfer devices.

Furthermore, in the FTL mentioned above, since it is required to release and attach the workpiece or the pallet with respect to the workpiece fixing device on the worktable provided in each of the machine tools and on each of the workpiece transfer devices every time the machining process on the workpiece advances, these non-machining time reduces the productivity in the machining system. Especially, the "releasing-attaching" operations are carried out every time the workpiece is transferred to the machine tool in the next machining operation, so that a surface to be machined in the next machining operation in which the machined surface in the previous machining operation of the same machining system is used as a standard receives the influence in the decline of the machining accuracy resulting from the "releasing-attaching" operation of the workpiece.

Accordingly, a further object of the present invention is to provide a flexible manufacturing system in which the releasing-attaching" operation of a workpiece is not performed, which is capable of not only reducing the non-machining operation time but also eliminating the decline of the machining accuracy resulting from the releasing-attaching" operation of the workpiece.

Moreover, in the conventional FTL, it is required to only adjust the operating time of the system against the fluctuation of the load freighted with the FTL.

It is therefore a still further object of the present invention to provide a flexible manufacturing system which is capable of facilitating adjustment of the capacity in one of machining lines in correspondence with the load fluctuation freighted therewith.

An object according to the present invention is to provide a flexible manufacturing system, which even after each of workpieces is attached to a workpiece supporting device once and the machining operation is performed thereon in one of plural machining lines, can machine the workpiece in a successive machining line without being released from the workpiece supporting device.

It is the other object according to the present invention to provide a flexible manufacturing system which can dispense with tool changing operations while a workpiece is machined at the front of a spindle head. Namely, plural tools used on a machining line are constantly attached to plural spindle heads for the machining operations' purpose, respectively, and a workpiece transfer unit is indexed at the front of the spindle head corresponding to the machining operation assigned to its workpiece, so that the tool changing operation is not required during the machining operation for its workpiece.

Another object according to the present invention is to provide a flexible manufacturing system which can resolve various problems in which plural self-propelled workpiece transfer units are input to one machining line at the same time, such as a backup in case that excess numbers of the workpiece transfer units are input into the machining line, or such as an interference between adjacent two of the workpiece transfer units.

It is a still further object according to the present invention to provide a flexible manufacturing system wherein plural tools used on a machining line are respectively attached to plural spindle heads constantly, which is capable of increasing the rotation of a tool spindle in each of the spindle heads gradually, and of naturally stopping it, whereby it can be established to guarantee the rotational accuracy of the tool spindle for a long time without decreasing the productivity.

Briefly, a flexible manufacturing system according to the present invention is composed of at least one machining line on which a workpiece transfer unit is movably guided from a staring end of the machining line to a finishing end thereof in a first horizontal direction, and plural spindle heads arranged along the machining line to each of which a tool spindle is rotatably supported to attach a tool thereto. The workpiece transfer unit on which a workpiece supporting device is mounted is indexed at the front of each of the objective tool heads in turn, and a workpiece attached to the workpiece supporting device is machined in accordance with an NC program memorized in a main control unit by relatively moving the workpiece. With this construction, it is not required to change the tool like a conventional machine tool, so that the locomotion from the machining operation performed by a certain tool to that performed by the next one is carried out by merely indexing the workpiece transfer unit at the front of the next spindle head, whereby time spent for the so-called "chip-to-chip" operation can be reduced.

Further, it is not necessary that the tool spindle of the spindle head is rapidly stopped and operated in rotation, it is therefore possible to maintain the rotational accuracy of the tool spindle in high accuracy for a long time. At the same time, it is unnecessary to frequently release and attach the workpiece on the machining line as required in the conventional FTL, so that the decline in the machining accuracy resulting from the "release-attach" operation can be reduced.

According to the present invention, a feed mechanism for traveling the workpiece transfer unit along the machining line is configured by a linear motor. Since the workpiece transfer unit is indexed at the front of the objective spindle head by the linear motor in turn, it is positioned with high accuracy and at a high speed in a longitudinal direction of the machining line, whereby each of the workpiece transfer units can be indexed at the front of the objective spindle head at a short time. Further, it can be facilitated to input the workpiece transfer unit into the machining line and to output it therefrom.

A backward machining line paired with the machining line (referred to as "forward" machining line hereinafter) is further provided parallel to the forward machining line, in accordance with the present invention, in which unit transfer devices are respectively provided at both ends of these machining lines. In such a construction, the workpiece transfer unit is input from one end of the forward machining line and output from the other end thereof, and it is successively input from the other end of the backward machining line and output from one end thereof. Namely, the workpiece transfer unit is transferred so as to substantially circulate in one direction on both machining lines. After the machining operation on the workpiece supported on the workpiece transfer unit is finished in the forward machining line, the machining operation is successively performed in the backward machining line the workpiece is supported by the workpiece supporting device. Thereafter, the workpiece transfer unit is readily input into the forward machining line for the machining operation of another workpiece after releasing the workpiece, so that the workpiece transfer unit can be used effectively.

In accordance with the present invention, a temporary workpiece table is provided at each of the starting and finishing ends of the forward and backward machining lines on which table the machined or unmachined workpiece is mounted. Since the machining operation on the workpiece is finished in each of the forward and backward machining lines, the backward machining line can be utilized as the return process to the forward machining line for the actual machining operation.

Furthermore, according to the present invention, the main control unit includes a control means for controlling the workpiece transfer unit so as to load the workpiece from the workpiece temporary table and to release the machined workpiece thereon. Therefore, an additional loading mechanism cannot be required for the "load-release" operation between the workpiece temporary table and the workpiece transfer unit.

Each of the unit transfer devices is composed of an automatic guided vehicle travelable in a second horizontal direction perpendicular to the first horizontal direction. At opposite sides of the machining lines relative to the automatic guided vehicle, a waiting station is arranged, and a same guideway as that provided on each of the machining lines is configured on each of the waiting stations and the automatic guided vehicle for slidably guiding the workpiece transfer unit. Further, on each of the automatic guided vehicles, there is provided a loading mechanism for loading and unloading the workpiece transfer unit on each of the machining lines when it is brought alongside of the machining line. The loading mechanism mounted on at least one of the automatic guided vehicles can be so constructed to load and unload the workpiece transfer unit on the waiting station when it is brought alongside thereof, so that the number of workpiece transfer units input from the waiting station can be adjusted in correspondence with the fluctuation in the production, whereby it is possible to operate at an effective speed the workpiece transfer unit with the number thereof corresponding to the required production.

Further, a repairing station is arranged at opposite sides of the machining lines against the automatic guided vehicle, on which a guideway of the same construction as that provided on the waiting station is formed, so that a negative influence in the expandability of the system in the future is not derived from the arrangement of the repairing station. Moreover, the repairing station can be also used as a temporary escaping station for the workpiece transfer unit output from the waiting station, besides a radical function that maintains and repairs the workpiece transfer unit.

A tool storage magazine is further arranged along a traveling course of at least one of the automatic guided vehicles, and tool changer guideways are respectively provided on the machining lines and at least one of the automatic guided vehicles. Since the tool changer is mounted on a self-propelled vehicle shuttled between the tool storage magazine and the objective spindle head on the machining line by traveling on the tool changer guideways, the tool of each of the spindle heads arranged along the machining lines can be changed by one or a few tool changers.

According to the present invention, a unit number control means is provided for controlling the number of the workpiece transfer units used concurrently, the load balance on the machining line can be kept optimally.

A unit interval control means is further provided for the interval between the plural workpiece transfer units concurrently used on the machining lines, so that two adjacent workpiece transfer units will not interfere with each other. In the control method of the unit interval control means, in a case that the workpiece transfer unit fed at a rapid feed rate toward the objective spindle head closes with the antecedent one beyond a predetermined interval, it is so controlled to stop or decelerate to a feed rate near a substantial stop. Since this stopping operation does not disturb the machining operation including the rapid feed operation at the front of the objective spindle head, the machining efficiency can be kept high. Preferably, the aforementioned predetermined interval is set to the number of units of the spindle head, so that the setting of the predetermined interval can be executed easily and exactly.

Further preferably, since the unit interval is controlled so that some of the spindle heads are between adjacent two of the workpiece transfer unit, the next machining operation can be performed by retracting the antecedent workpiece transfer unit backward by some numbers of units of the spindle head after the machining operation is completed at a certain spindle head. Therefore, it is possible to enhance the flexibility in the machining process design.

According to the present invention, a unit controller including an NC control unit is mounted on each of the workpiece transfer units, and the electric power is supplied the unit controller from power lines provided parallel with the machining line through a trolley mechanism. With this construction, the degree of the freedom on the traveling of the workpiece transfer unit can be improved. For example, in a case that the FTL is composed of plural machining lines, each of the workpiece transfer units can be transferred to any of the machining lines in order to adjust the load balance between the machining lines, so that the flexibility can be improved in the FTL system as a whole.

Still further, a sub-transfer unit is provided separately from the workpiece transfer unit, on which the unit controller is mounted. The sub-transfer unit is moved in the system along with the workpiece transfer unit without the machining operation performed at the front of the spindle head. Therefore, the workpiece transfer unit can be separated from the load weight of the unit controller during the machining operation, so that as a result of the release of the load weight, it can be fed in easily and the machining accuracy can be also improved.

According to the present invention, the workpiece transfer unit is mounted with the unit controller on a traveling member which is movably guided on the machining line in the first horizontal direction. Further, on the traveling member, there is formed a sub-slide for moving the workpiece supporting device in two directions perpendicular to the first horizontal direction, and the sub-slide itself is also moved in the first horizontal direction. With this construction, the workpiece transfer unit is indexed at the front of the objective spindle head by operating the traveling member, and the sub-slide on the traveling member is fed to operate the machining feed for the machining operation on the workpiece by the objective spindle head. Therefore, the feed mechanism is less expensive and relatively low in the resolution for feeding the traveling member. Further, the workpiece transfer unit during the machining operation can be unwound from the load weight of the unit controller, so that as a result of the release of the load weight, it can be fed in easily and the machining accuracy can be also improved.

Moreover, the tool spindle of the objective spindle head is started in the rotation before the workpiece transfer unit reaches at the front of the objective spindle head, so that the rotation of its tool spindle can be gradually operated while the workpiece transfer unit is moved at the front of the objective tool spindle. As a result, the rotational accuracy of the spindle head can be guaranteed to high accuracy for a long time. Preferably, when the machining operation is finished at the spindle head, its tool spindle is naturally stopped and the other tool spindle of the next objective spindle head is started with respect to the rotation thereof at a time when the rapid transfer feed is started. Therefore, the tool spindle of the objective spindle head can be gradually rotated with the rapid transfer time. As a result, the rotational accuracy of the spindle head can be guaranteed to the high accuracy for a long time. Further, the tool spindle is stopped naturally, so that it is also possible to collect the inertial energy of the tool spindle during the natural stop, whereby an additional effect that the electric power is used effectively can be enjoyed.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which;

FIG. 11 is an explanation diagram showing a machining schedule table memorized in a memory of the main control unit;

FIG. 12 is an explanation diagram showing a unit location table memorized in the memory of the main control unit;

DETAILED DESCRIPTION OF THE PREFERRED EMBODIMENTS

Figure 1:
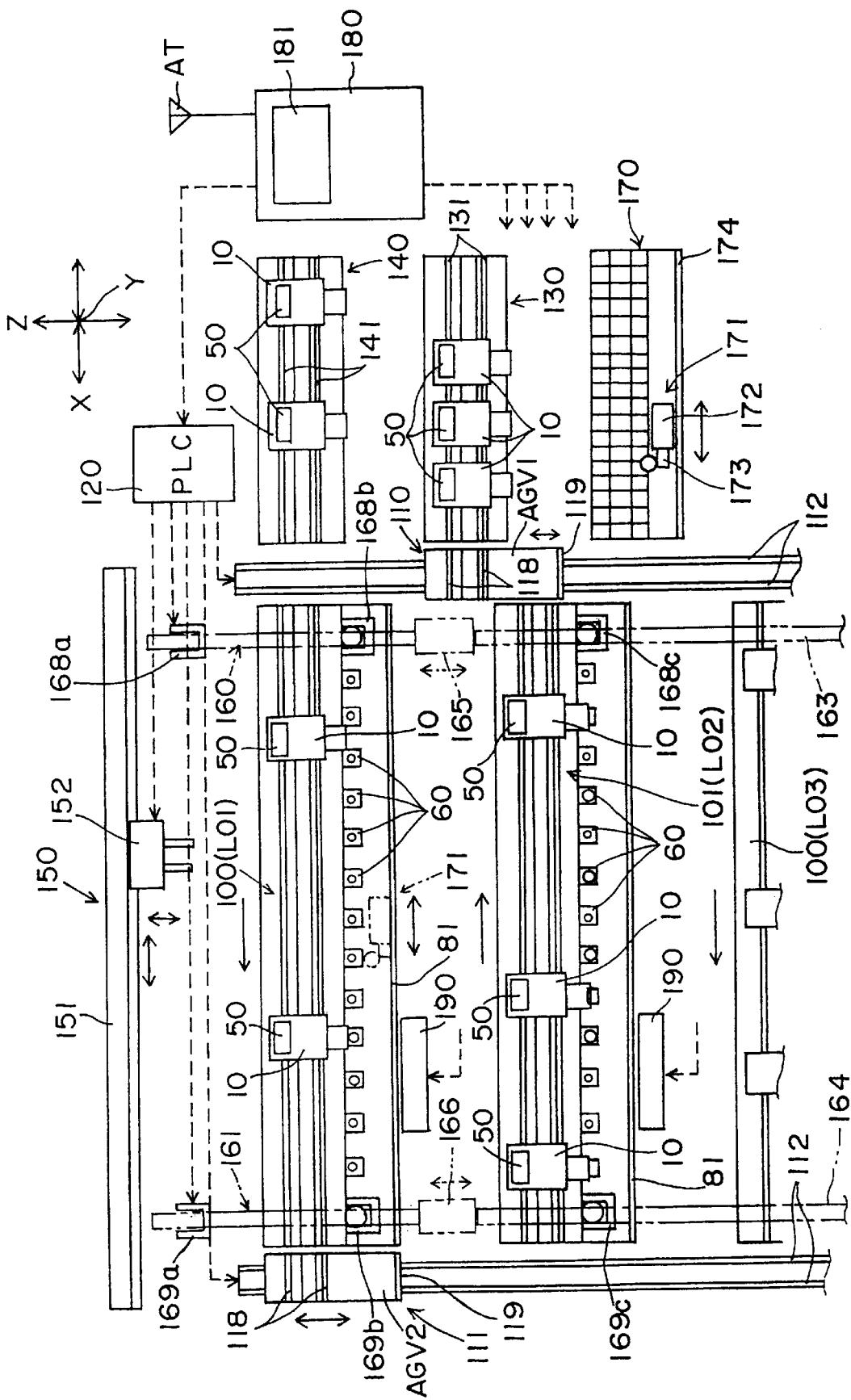
FIG. 1 is a general top plane view showing a first embodiment of a flexible manufacturing system according to the present invention.

The present invention will be described hereinafter with reference to the accompanying drawings.

First Embodiment

A flexible manufacturing system (referred to as "FTL" hereinafter) according to a first embodiment of the present invention, as shown in a general top plan view of FIG. 1, includes a pair of machining lines which are composed of a forward machining line 100 extending in a first horizontal direction (an X-axis direction) and a backward machining line 101 extending parallel with and adjacently to the forward machining line 100. Omitted in the drawings, the manufacturing system FTL includes one or two machining lines which are the same as or similar to the aforementioned forward and backward machining lines 100 and 101. In the explanation described hereinbelow, the first pair of the machining lines 100 and 101 will be described in detail. The forward line 100 sequentially receives a workpiece transfer unit 10 from a starting point at a right side thereof shown in FIG. 1, and sends out it from a finishing point at a left side thereof. Similarly, the backward line 101 receives the workpiece transfer unit 10 from a starting point at the left side, and sends out it from a finishing point at the right side with receiving order. In each of the machining lines 100 and 101, plural spindle heads 60 are spaced along a longitudinal direction (i.e., the X-axis direction) of the machining line.

Expediently to the explanation, the first embodiment shown in FIG. 1 represents that each of the machining lines 100 and 101 provides the thirteen spindle heads 60 however, the number of spindle heads 60 is not limited to thirteen. Namely, the number of spindle heads 60 arranged in each of the machining lines is determined by the required number of tools for machining a variety of workpieces which this system regards as a target, thereby being increased or decreased. The number of spindle heads 60 in each of the machining lines is basically assigned to the forward machining line 100 or the backward machining lines 101, so as to complete all of the machining on the variety of the workpieces except for the special workpiece. Further, in cases that a machining operation requires a special tool or that the workpiece is machined in plural machining processes, the machining operations can be performed with both of the forward machining line 100 and the backward machining line 101. Furthermore, a higher accuracy machining tool is arranged from the start point to the finish point of each of the machining lines to perform each of the machining operations with the order of a rough-milling process, a drilling process, a tapping process and a boring process.

First and second unit transfer devices 110 and 111 are respectively provided on both sides of the forward machining line 100 and the backward machining line 101. In general, the first unit transfer device 110 returns under control of a programmable sequence control unit (referred to as "PLC" hereinafter) 120 for a transfer control, the workpiece transfer unit 10 outputted from the backward machining line 101 to a waiting station 130, or transfers it between the waiting station 130 and a repairing station 140 which are arranged at an opposite side of the forward and backward machining lines 100 and 101 through the intermediary of the first transfer device 110. Further, the first transfer device 110 transfers the workpiece transfer unit 10 from the backward machining line 101 to the forward machining line 100 through the waiting station 130.

Contrary to the first transfer device 110, the second transfer device 111 transfers under the control of the PLC 120, the workpiece transfer unit 10 outputted from the each of the forward machining line 100 to the backward machining line 101. If another pair of the forward and backward machining lines 100 and 101, or sole backward machining line 101 is provided in which a tool for a special machining operation is arranged, the second unit transfer device 111 can transfer the workpiece transfer unit 10 outputted from each of the forward machining lines 100 to the backward machining line 101 having the tool for the special machining operation.

Figure 4:
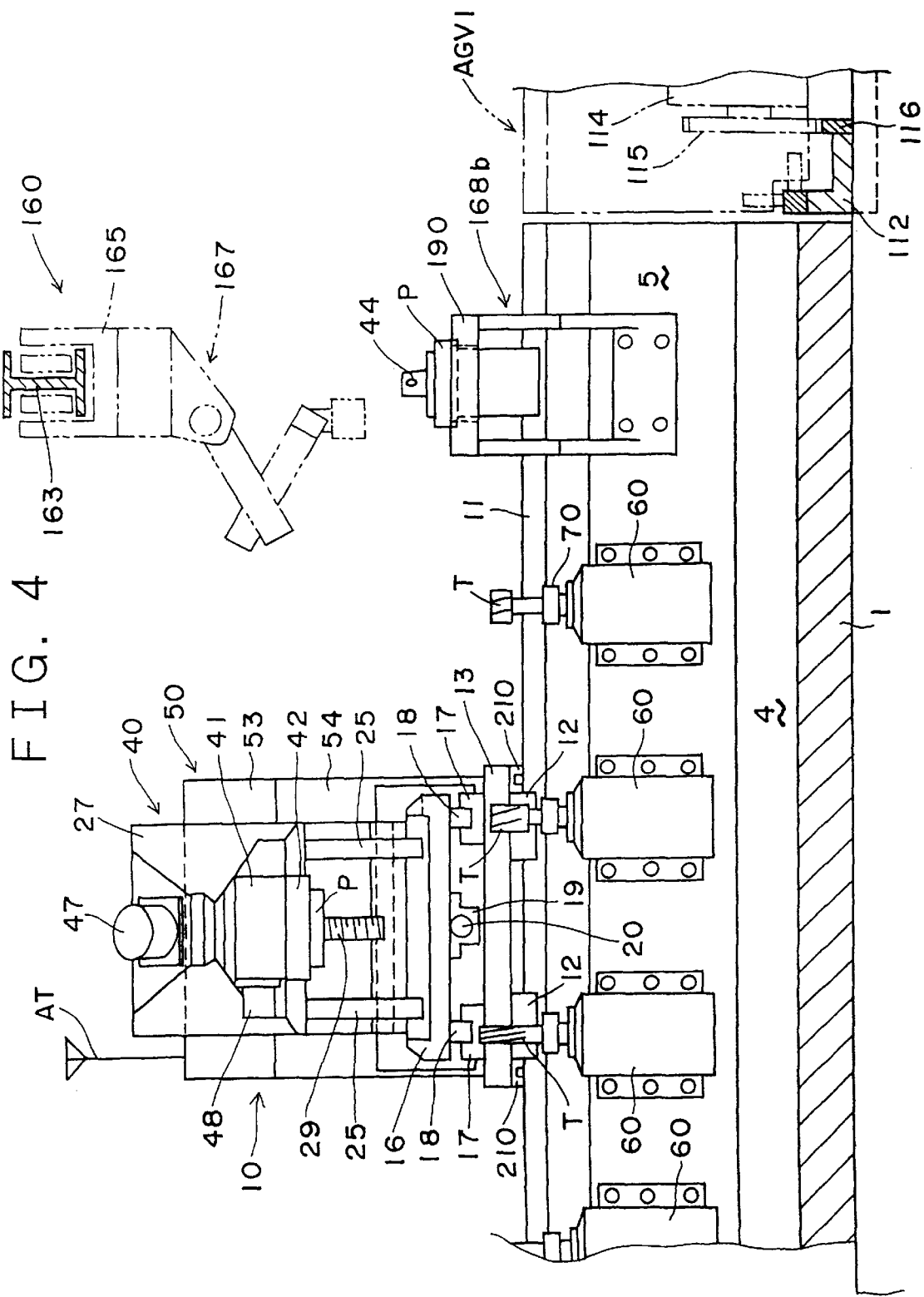
FIG. 4 is a partial elevational view of the system shown in FIG. 3.

The manufacturing system FTL further includes a workpiece storage device 150 and a pair of workpiece supply devices 160 and 161 which are controlled by the PLC 120. The workpiece storage device 150 is a conventional system used in a general flexible manufacturing system commonly so-called as an FMS. Briefly, the workpiece storage device 150 is composed of a tridimensional workpiece pool 151 and a workpiece loading-unloading mechanism 152. In detail, the tridimensional workpiece pool 151 is arranged parallel with each of the machining lines 100 and 101 and, stores a pallet P on which the workpiece is mounted (as shown in FIG. 4) into plural storage sections which can be addressed with an X-Y coordinate system. The workpiece loading-unloading mechanism 152 arranged in the front of the tridimensional workpiece pool 151 is addressed to the objective storage section by being indexed in the X-axis direction (left-right direction of FIG. 1) and in a Y-axis direction (vertical direction thereof), and then loads the pallet P from this storage section or unloads it thereto.

The workpiece supply devices 160 and 161, as shown in FIG. 4, is mainly composed of first and second rails 163 and 164 suspended from a ceiling of a factory in which this system FTL is housed, and arranged above right and left side ends of the machining lines 100 and 101 so as to be perpendicular thereto, self-propelled trucks 165 and 166 running along with the rails 163 and 164, and articulated robots 167 mounted on the self-propelled trucks 165 and 166, respectively.

As shown in FIG. 1 as an example, workpiece temporary loading tables 168a, 168b and 168c are fixedly arranged subjacently to an end portion of the first rail 163 at a side of the workpiece pool 151, to the first rail 163 at right side of the machining lines 100 and 101, respectively. On the other hand, workpiece temporary loading tables 169a, 169b and 169c of the same construction as the temporary tables aforementioned above are fixedly arranged subjacently to the second rail 164 at positions corresponding to the temporary tables 168a, 168b and 168c arranged, respectively.

The robot 167 moving along with the rail 163 picks up the pallet P set on the temporary table 168a on which the unmachined workpiece has been mounted, and loads it on the temporary table 168b of the forward machining line 100. On the contrary, the robot 167 on the first rail 163 transfers the pallet P on which the machined workpiece is mounted and which is set on the temporary table 168c of the backward machining line 101 by the workpiece transfer unit 10, and loads it on the temporary table 168a. On the other hand, the other robot 167 (not illustrated) moving along with the second rail 164 picks up the pallet P set on the temporary table 169a on which the workpiece has been mounted, and loads it on the temporary table 169c of the backward machining line 101. On the contrary, the other robot 167 transfers the pallet P on which the machined workpiece is mounted and which is set on the temporary table 169b of the forward machining line 100 by the workpiece transfer unit 10, and loads it on the temporary table 169a.

The loading-unloading mechanism 152 sets the pallet P with the workpiece to be machined taken out from the storage section on the temporary table 168a or 169a and conversely, stores the pallet P with the machined workpiece thereon into the workpiece pool 151.

The system FTL shown in FIG. 1 further includes a tool storage magazine 170 and a self-propelled tool changer 171. The tool storage magazine 170 stores alternative tools in which characters or sizes differ from the tool attached to the spindle head 60 in each of the forward and backward machining lines 100 and 101, and backup tools in which those are substantially same as the tool attached thereto.

Figure 2:
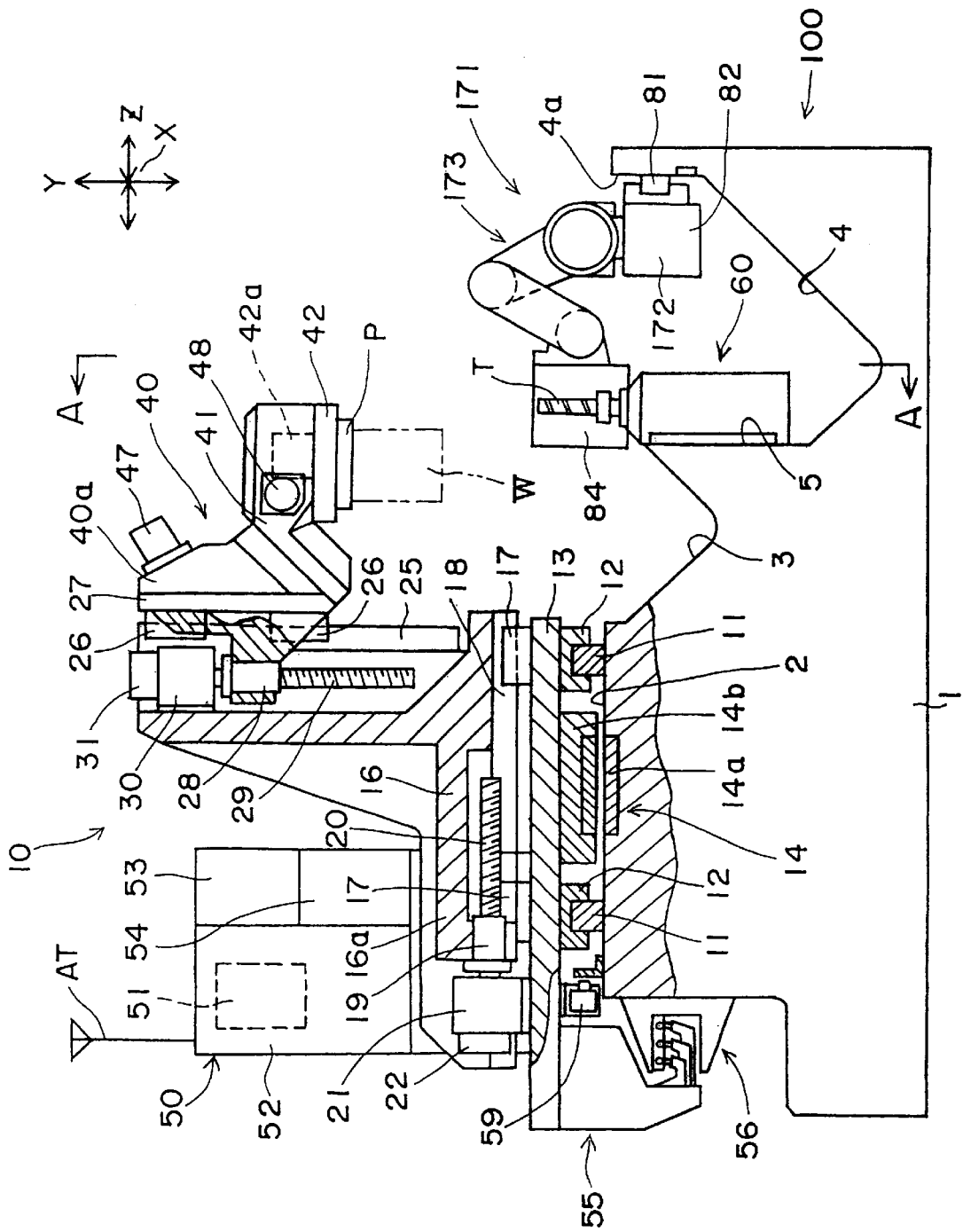
FIG. 2 is a side elevational view of a machining line with a partial cross-sectional view of a workpiece transfer unit running thereon in accordance with the system shown in FIG. 1.

As shown in FIG. 2, the self-propelled tool changer 171 provides means for holding a few tools (e.g., tool holding holes H1–H3 shown in FIG. 3) on a self-propelled truck 171 on which a tool changing robot 173 is mounted. After the tool changing robot 173 picks up the objective tool from the tool storage magazine 170 and sets it in the holding means (e.g., H2), the self-propelled truck 172 is transferred on the first unit transfer device 110 from the tool storage magazine 170. Further, the self-propelled truck 172 is transferred to the forward machining line 100 or the backward machining line 101 which provides the objective tool head 60, and then it is indexed at a predetermined position where it faces therewith. At that position, the robot 173 takes away the used tool from the objective tool head 60 to dispose it into the holding means (e.g., H3) of the self-propelled truck 172, and then takes another tool out of the holding means (e.g., H2) to attach it to the objective tool head 60. Subsequently to this operation, the robot 173 (i.e., the self-propelled truck 172) returns to the tool storage magazine 170 along with the same course.

The control system of this system consists of a main control unit 180 including a computer 181 for systematically controlling this system, a tool spindle drive control unit 190a, the PLC 120, a tool changer control unit 82 and a unit controller 50. The tool spindle drive control unit 190a is provided on each of the forward and backward machining lines 100 and 101, while the PLC 120 controls all of the workpiece storage device 150, the workpiece supply devices 160 and 161, and the first and second unit transfer devices 110 and 111, sequentially. Further, the tool changer control unit 82 is mounted on the self-propelled truck 172 shown in FIG. 3, the unit controller 50 is installed in each of the plural workpiece transfer units 10 as shown in FIG. 2. The unit controller 50 on each of the plural unit transfer devices 10 and the tool changer control unit 82 on the self-propelled truck 172 are communicated by wireless with the main control unit 180 through antennas provided thereon to transmit operation commands, positional information and the like.

Next, as an example of each of the machining lines 100 and 101, the detail construction of the forward machining line 100 and the unit transfer device 10 will be described hereinafter with reference to FIGS. 2–4.

As well-understood with reference to FIG. 2, the forward machining line 100 has a line base 1 in which a horizontal upper surface 2 is formed at a rear portion (left side of FIG. 2) to mount the unit transfer device 10 thereon. Further, a first channel 3 in the form of a V-letter in a cross-section is formed on a central upper portion of the line base 1 for collecting cutting chips and coolant, while a second channel 4 in the form of a V-letter in a cross-section is formed on a front side of the line base 1, in which the spindle head 60 is secured thereto and the self-propelled tool changer 171 passes therethrough.

On the horizontal upper surface on which the workpiece transfer unit 10 is mounted, a pair of straight rails 11 are secured in parallel in a first direction (i.e., the X-axis direction) perpendicular to a plane of FIG. 2 parallel with a longitudinal direction of the line base 1. Further, a pair of circulating ball bearings 12 movable on the straight rail 11 (2 pieces per rail) are fixed onto a lower surface of a traveling member (a first movable member) 13. On the horizontal upper surface 2, plural magnet plates 14a consisting of a linear motor 14 of a servo-control type are fixedly arranged along with an entire length of the line base 1 in the longitudinal direction, while a moving coil 14b of the linear motor 14 is secured onto a lower surface of the traveling member 13 opposite thereto.

On the traveling member 13, a second movable member 16 in the form of an L-letter in a cross-section is movably guided in a second horizontal direction (i.e., a Z-axis direction) perpendicular to the X-axis direction. In order to slidably move the second movable member 16 in the Z-axis direction, there is used two pair of circulating ball bearings 17 secured onto the first movable member 13, and a pair of straight rails 18 fixed onto a lower surface of the second movable member 16 movable therewith. In FIG. 2, the straight rail 18 and a pair of the circular ball bearings 17 arranged on this side of the drawing in the X-axis direction are omitted therein.

A driving mechanism of the second movable member 16 is composed of a ball nut 19 secured on a rear end portion of a horizontal portion 16a thereof, a ball screw 20 which is threadedly engaged with the ball nut 19 and is received at a rear side thereof in a thrust-bearing manner. The driving mechanism further includes a servomotor 21 secured on one end of the ball screw 20, and an rotary encoder 22 arranged behind the servomotor 21.

In the front of a vertical column portion of the second movable member 16, there are mounted two parallel straight rails 25 mutually perpendicular to the both X- and Z-axis directions, and two pair of circulating ball bearing 26 guided by the rails 25 are secured onto a back surface of a third movable member 27, in which the third movable member 27 and a workpiece supporting device 50 secured in the front thereof can be moved vertically. In FIG. 2, there are omitted the straight guide rail 25 and a pair of the circular ball bearings 26 arranged on this side of the drawing in the X-axis direction of which the guide mechanism of the third movable 27 member is composed.

A vertical driving mechanism of the third movable member 27, similarly to that of the second movable member 16, is composed of a ball nut 28 fixed to the third movable member 27, a ball screw 29 rotatably supported in the second movable member 16, a servomotor 30 for rotating the ball screw 29, and a rotary encoder 31 mounted behind the servomotor 30.

The workpiece supporting device 40 includes a first index table 41 which is rotatable around an axis inclined at 45 degrees with respect to an axis of the ball screw 29, i.e., a vertical movable direction of the third movable member 27. On the first index table 41, a second index table 42 is rotatably supported on a radially offset portion of the first index table 41 from a rotational axis thereof, around an axis inclined at 45 degrees with respect to the rotational axis thereof.

In a central portion of the second index table 42, as shown in FIG. 4, there is a taper cavity receiving a conical shank portion 44 that vertically extends from the back of the pallet P to which the workpiece to be machined is secured (generally, whose shape is a square hexahedron but is not limited thereto). Further, inside of the second index table 42, there is formed a clamp mechanism 42a which comes into engagement with a window portion of the conical shank portion 44 by inserting an end portion thereof into the taper cavity of the second index table 42.

According to this mechanism, the workpiece Wp fixed on the second index table 42 through the pallet P can be moved to an arbitrary position in a three dimensional space with respect to each of the tools T of the spindle heads 60 mounted on the line base 1 by the movement of the first, second and third movable members 13, 16 and 27. Further, all of surfaces of the workpiece Wp except the surface thereof on which the pallet P is mounted can be faced with the tool T due to the index movement of the first and second index tables 41 and 42. In FIG. 2, numerals 47 and 48 denote servomotors for the first and second index tables 41 and 42, respectively.

In each of the index mechanisms on the first and second index tables 41 and 42, the mechanism itself does not define the feature of the present invention and therefore, the detail thereof is omitted. However, it is preferably adopted such a mechanism shown in FIG. 1 or FIG. 2 which is disclosed in Japanese Patent Publication No. 10-29125 (KOKAI) as titled "rotary index device." Namely, the workpiece supporting device 40 can be constructed by applying the mechanism of FIG. 1 disclosed in that Publication between a main body 40a of the workpiece supporting device 40 and the first index table 41, and between the first and second index tables 41 and 42.

On the traveling member (first movable member) 13, the unit controller 50 is mounted across a horizontal portion of the second movable member 16. The unit controller 50 is composed of a communication control unit (not illustrated) for transmitting the instruction command, data and the like during the other of control units through the antenna T, a CNC unit 51, an NC section 52 including a servo amplifier, a PLC section 53 including a sequence controller, and further a pressurized oil control section 54 for controlling an oil pressure pump unit and a plurality of electromagnetic valves. The CNC unit 51 controls the moving coil 14b of the linear motor 14 and the servomotors 21, 30, 47 and 48 in accordance with an NC program previously prepared in each of the plural workpieces.

The PLC section 53 mainly controls the pressurized oil control section 54 according to a sequence program to control a clamp-unclamp operation of the first and second index tables 41 and 42, and that of the workpiece pallet P.

A trolley mechanism 55 for power supply cables is fixedly arranged on a rear lower surface of the traveling member 13 in which an electric power from a power supply 56 arranged behind the line base 1 is supplied to the unit controller 50 through the power supply cables. Apparently in FIGS. 3–5, a cable supporting member 56a made of a insulating material is fixed on a back surface of the line base 1 to horizontally support three-phase AC lines U, V and W from the power supply 56 thereon along the entire length of the line base 1. Both ends of the power lines U, V, W are slightly inclined upwardly on both end portion of the line base 1.

In the trolley mechanism 55, a bracket 55a is fixed on a lower surface of the movable member 13, to which three levers 55u, 55v and 55w are pivotably supported through an axis 55b parallel with the power lines U, V and W. Further, the levers 55u, 55v and 55w are made of an insulating material, and rests formed on end portion thereof are respectively brought into contact with the corresponding power lines U, V and W by tensional springs 55e. Three output lines 57 contact one ends thereof with the rests of the levers 55u, 55v and 55w, and communicate the other ends thereof with a power circuit (not illustrated) of the unit controller 50, respectively.

Stop bolts 55f corresponding to the respective levers 55u, 55v and 55w are provided on the bracket 55a to limit counter-clockwise rotational positions corresponding thereto. As described hereinbelow, in a case that each of the workpiece transfer units 10 is input into the forward machining line 100 or the backward machining line 101, the rests of the levers 55u, 55v and 55w do not come into contact with the power lines U, V and W at the moment of the input operation. However, the rests of the levers 55u, 55v and 55w come into contact with the power lines U, V and W, respectively, until the workpiece transfer unit 10 reaches in the front of each of the temporary loading tables 168b and 169c arranged at starting points of the machining lines 100 and 101. In the rests' contacting relationships with the power lines U, V and W, its contacts of the rest is maintained until the workpiece transfer unit 10 reaches the front of the temporary loading tables 169b and 168c arranged at finish points of the machining lines 100 and 101.

Figure 5:
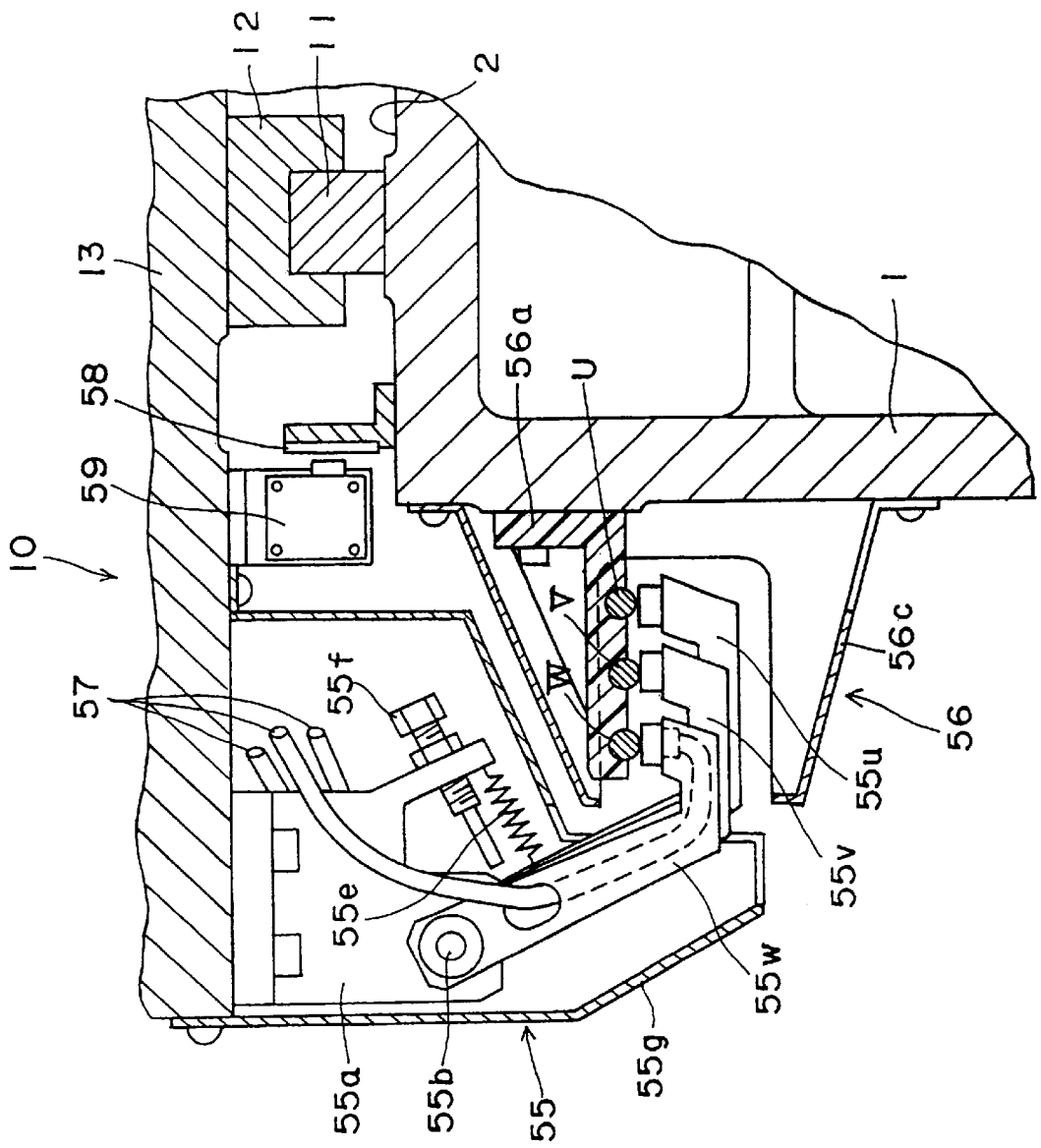
FIG. 5 is a partial enlarged view showing a trolley mechanism for pulling out power lines in accordance with the workpiece transfer unit shown in FIG. 2.

In FIG. 5, numeral 55g denotes a cover of the trolley mechanism 55, and numeral 56c denotes a cover of the power cable supporting unit 56. The cover 56c is opened at back and both sides' surfaces thereof to pass the levers 55u, 55v and 55w therethrough. As further shown in FIG. 5, a magnetic scale 58 is secured on the rear portion of the horizontal upper surface 2 of the line base 1, through a bracket fixed thereon, to detect a position of the workpiece transfer unit 10, and a magnet reader 59 is attached to a lower surface of the traveling member 13 so as to face the magnet scale 58. With this construction, a detected signal output from the magnet reader 59 can be used for controllably positioning the traveling member 13, i.e., the workpiece transfer unit 10 in the X-axis direction.

Figure 3:
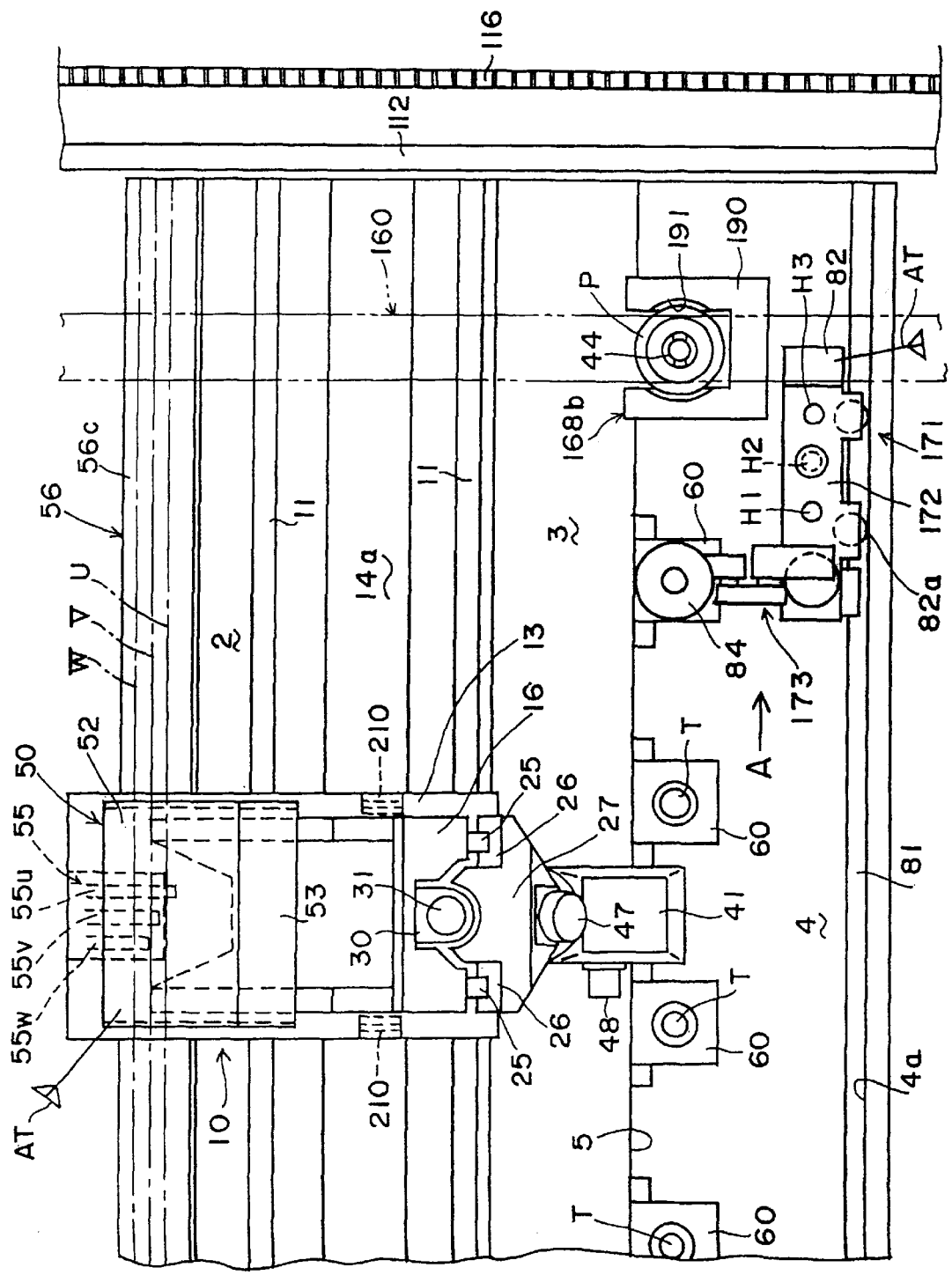
FIG. 3 is a partial elevational view of the system shown in FIG. 1.
Figure 6:
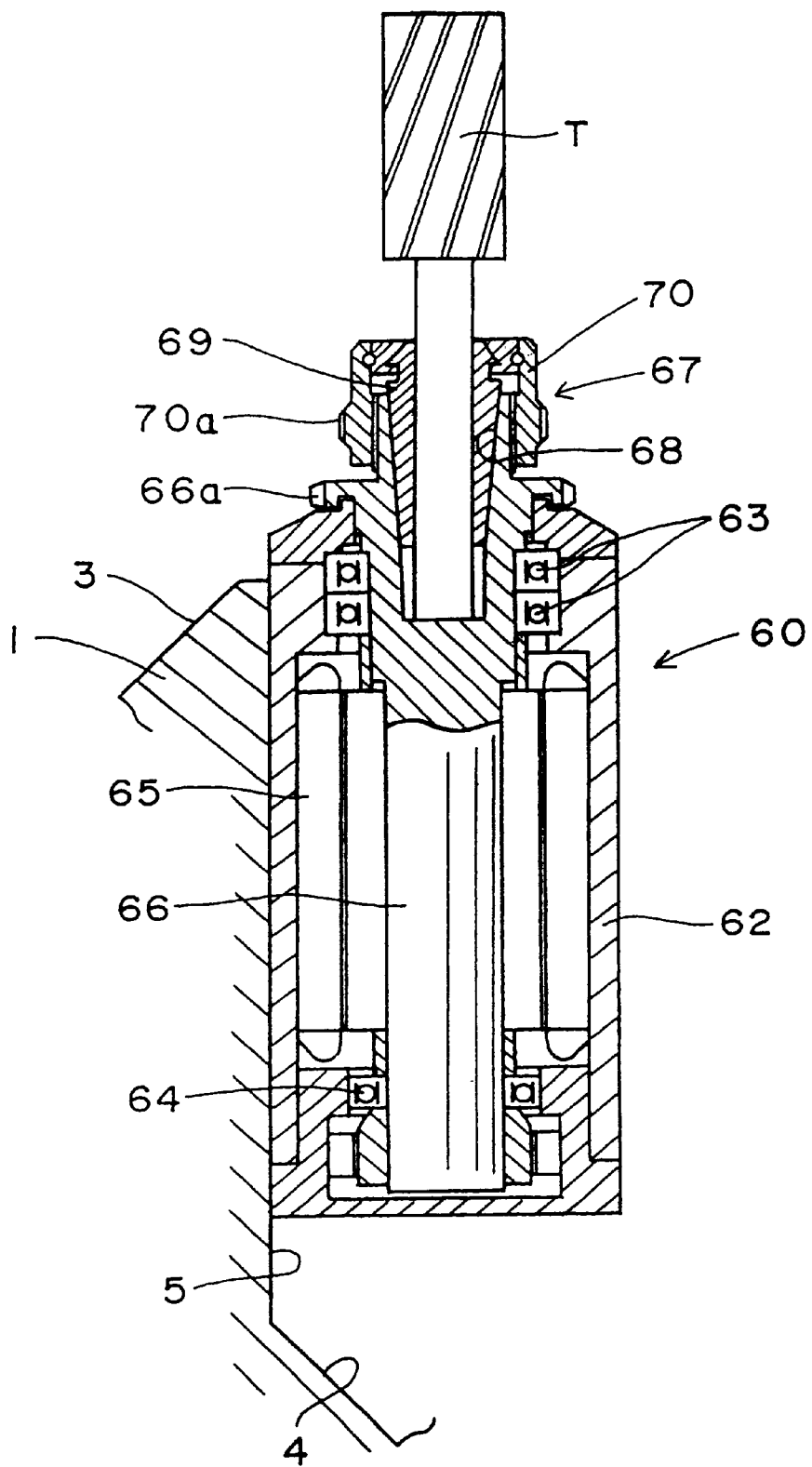
FIG. 6 is a cross-sectional view showing a tool spindle head according to the present invention.

As apparently understood in FIGS. 2–4, the plural spindle heads 60 as mentioned above are secured, in line, on a vertical wall surface 5 of the second V-shape channel 4 adjacent to the first V-shape channel 3 along a moving direction (i.e., the X-axis direction) of the traveling member 13. As shown in FIG. 6, each of the spindle heads 60 is composed of a built-in motor 65 which is rotatably supported in a head housing 62 through bearings 63 and 64 provided at upper and lower end portions thereof, a tool spindle 66 rotationally driven by the built-in motor 65, and a tool attaching mechanism 67 of a collet type formed at an upper end portion of the tool spindle 66.

The tool attaching mechanism 67 includes a collet member 69 fitted in a taper hole 68 which is opened at an upper end of the tool spindle 66, wherein a fixed ring 70 is threadedly engaged with an outer peripheral portion formed at the upper end thereof. Further, the fixed ring 70 is taper-engaged with a conical portion formed at an upper end of the collet member 69. In this construction, the fixed ring 70 is rotated in a normal direction, a straight inside hole of the collet member 69 is narrowed to clamp a shank portion disposed therein of the cutting tool T such drilling, tapping and end-milling tools. In a case that the fixed ring 70 is rotated in a reverse direction, the straight inside hole of the collet member 69 is enlarged by releasing the engagement of the collet member 69 with the taper hole 68 of the tool spindle 66, whereby the tool T can be unclamped.

In order to form a labyrinth seal, on outer peripheral portions of a flange portion formed at an upper end portion of the tool spindle 66 and the fixed ring 70, there are respectively formed spline engagement portions 66a and 70a so that a tool changing head 84 can rotate the fixed ring 70 in the normal and reverse direction in a tool changing operation thereof described hereafter.

Figure 7:
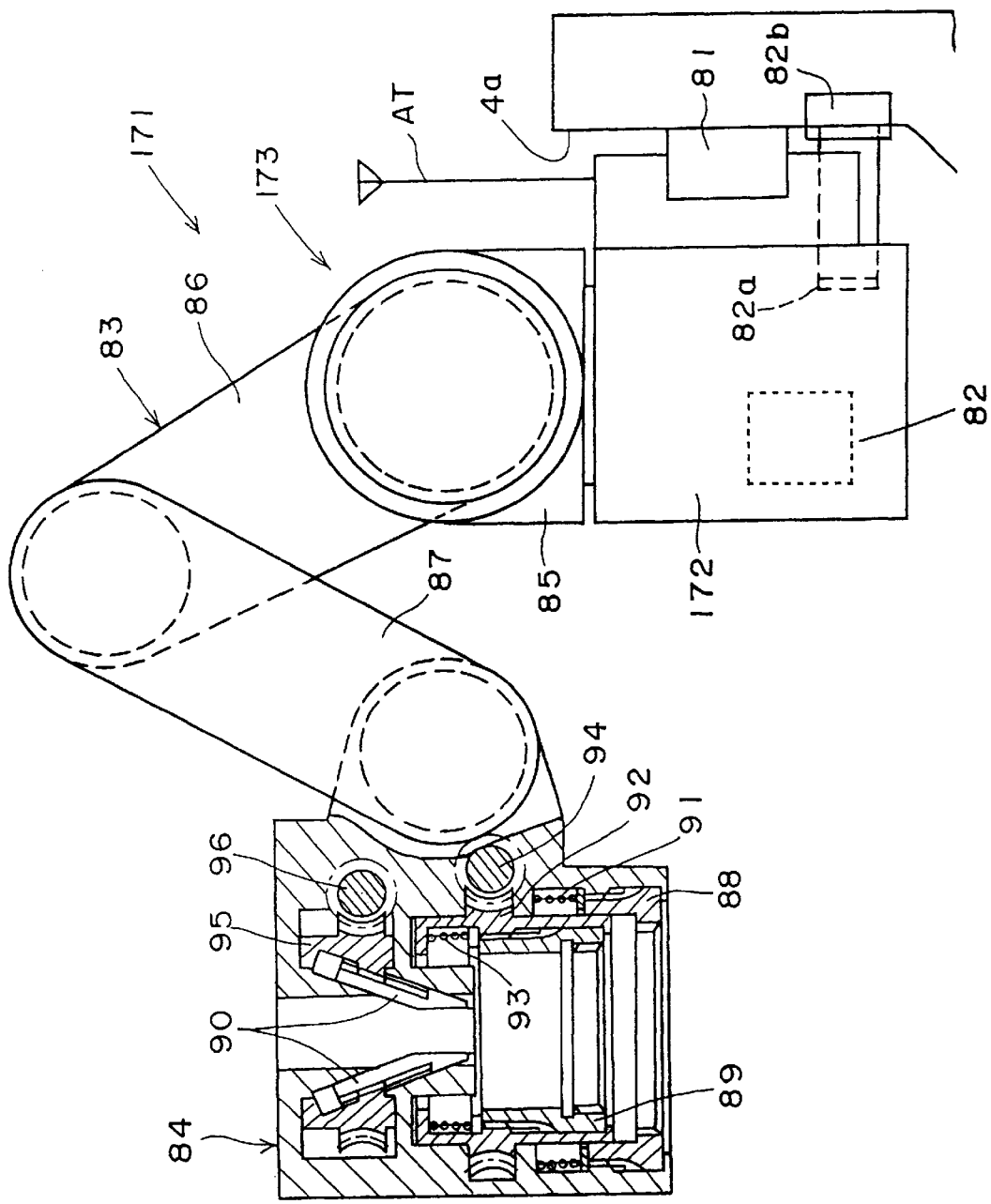
FIG. 7 is a partial cross-sectional view of a self-propelled tool changer taking from an arrow A of FIG. 3.

FIG. 7 shows the self-propelled tool changer 171 which is used for replacing a new tool for the old tool having reached to its lifetime (referred to as "a lifetime tool" hereinafter) in the cutting tool T attached to the plural spindle head 60. This tool changing operation is performed when the lifetime tool is not used. One feature in this embodiment is in that it is not required to operate the tool changer 171 more quickly than that used in the conventional machine tool. Because, the tool changing operation can be performed when the lifetime tool is not used, and the machining operation on the workpiece Wp can be continuously carried out by using the non-lifetime tool during the tool changing operation.

The tool changer 171 is movably provided at an opposite side to the workpiece transfer unit 10 with respect to the spindle head 60. More specifically, there is fixedly provided a tool changer guideway 81 on a vertical wall surface 4a of the second V-shape channel 4 opposite to the vertical wall surface 5 thereof on which the plural spindle heads 60 are supported, so as to horizontally extend parallel with an arrangement direction of the plural spindle heads 60, i.e., the moving direction of the traveling member 13 (the X-axis direction). Further, the self-propelled truck 172 electrically driven by a battery is movably guided on the tool changer guideway 81. The self-propelled truck 172 includes a friction wheel 82a driven by a servomotor (not illustrated) provided therein, whereby it can be indexed to the front of the arbitrary spindle head 60 by rolling the friction wheel 82a on a rolling surface member 82b fixedly provided with the tool changer guideway 81 or parallel therewith.

FIG. 3 shows a state in which the self-propelled truck 172 is indexed to replace the lifetime tool attached on the spindle head 60 at the starting point of the machining line. An index operation of the self-propelled truck 172 is performed under conventional numerical control, or under sequentially control with being selectively positioned to plural positions where a proximity switch LS (referring to FIG. 15) operates in correspondence with a position arranged at each of the spindle heads 60. Further, the tool changer control unit 82 is mounted on the self-propelled truck 172 to control the positioning operation thereof and the tool changing operation of the tool changing robot 173. The non-illustrated battery for driving the servomotor for the friction wheel 82a is used with respect to the power supply to the control unit 82.

In the self-propelled truck 172 shown in FIG. 3, there are the plural tool holes H1–H3 functioning as a tool supporter or the tool supporting means. Prior to the tool changing operation, new tools are supported in some of the tool holes (e.g., H1 and H2), while the remaining hole (H3) is kept empty to receive the lifetime tool.

Referring back to FIG. 7, the tool changing robot 173 further includes an access mechanism 83 provided on the self-propelled truck 172 as generally used in a conventional articulated robot, and the tool changing head 84 supported on an end portion of the access mechanism 83. The access mechanism 83 is composed of a horizontal rotary table 85, a first arm 86 swinging within a vertical plane in connection with the horizontal rotary table 85, a second arm 87 swinging within a vertical plane in connection with the first arm 86, and plural servomotors (not illustrated) for driving the rotary table 85, the first and second arms 86 and 87 in accordance with a sequence program for the predetermined tool changing operation.

The tool changing head 84 mainly comprises a whirl-stop sleeve 88, a driving sleeve 89 and plural tool supporting jaws 90. The whirl-stop sleeve 88 is permitted to move in only an axial direction thereof and is downwardly urged by a spring 91, to prevent the tool spindle 66 from rotating by coming into engagement with the spline portion 66a thereof. The driving sleeve 88 is downwardly urged by a spring 93 while being permitted to move within a cylindrical portion 92 in only the axial direction thereof. In this configuration, when the rotation of a non-illustrated driving motor provided on the tool changing head 84 is transmitted to the cylindrical portion 92 through a worm-worm wheel mechanism 94 under a situation that the driving sleeve 89 is engaged with the spline portion 70a of the fixed ring 70 threadedly engaged with the tool spindle at the upper portion thereof, the tool spindle 66 is prevented from rotating by engagement of the spline portion 66a with the whirl-stop sleeve 88, so that the fixed ring 70 can be rotated with respect to the tool spindle 66.

The jaws 90 are engaged at its back sides with a scroll gear formed in an inside hole of a worm wheel 96. When the rotation of a non-illustrated motor formed on the tool changing head 84 is transmitted to the worm wheel 95 through a worm-worm wheel mechanism 96, an available clamp range of the jaws can be enlarged or diminished. The access mechanism 83 has a conventional parallel link mechanism therein to keep an attitude of the tool changing head 84 at a constant (i.e., vertically) even if the tool changing head 84 is repositioned.

FIGS. 3 and 4 show the workpiece temporary loading table 168b provided at the right end of the forward machining line 100. On an upper portion of the workpiece temporary loading table 168b, there is provided a pallet supporting member 190 which takes the form of a crotch shape opening to the workpiece transfer unit 10, in which circular grooves 191 are formed inside of opposite surfaces of the pallet supporting member 190. When the pallet P is loaded on the workpiece temporary loading table 168b, outer peripheral portions of the pallet P radially opposite to each other are engaged with the circular grooves 191, respectively.

Since the aforementioned first unit transfer device 110 is of the same construction as the second unit transfer device 111, only the first unit transfer device 110 will be explained hereinafter with reference to FIGS. 1, 4 and 8. The first unit transfer device 110 is composed of a raceway track 112 formed from a pair of rails which are laid on a floor surface at a right end of the machining lines 100 and 101 in FIG. 1 so as to extend in the second horizontal direction (Z-axis direction), and an automatic guided vehicle AGV1 running on the raceway track 112.

On the automatic guided vehicle AGV1, there are mounted a non-illustrated battery, a motor 114 with a reduction mechanism driven by the battery, and a non-illustrated relay circuit device for controlling an operation of the motor 114. In this situation, a driving gear 115 fixed to an output shaft of the motor 114 is engaged with a rack shaft 116 provided with the raceway track 112, so that the automatic guided vehicle AGV1 can be self-propelled with the propulsion of the motor 114. Further, since output lines from the aforementioned PLC 120 are connected with the relay circuit device, the automatic guided vehicle AGV1 can be brought alongside any of the machining lines 100 and 101, the tool storage magazine 170, the waiting station 130 and the repairing station 140, based upon position detection signals from limit switches (not shown) arranged thereat.

Figure 8:
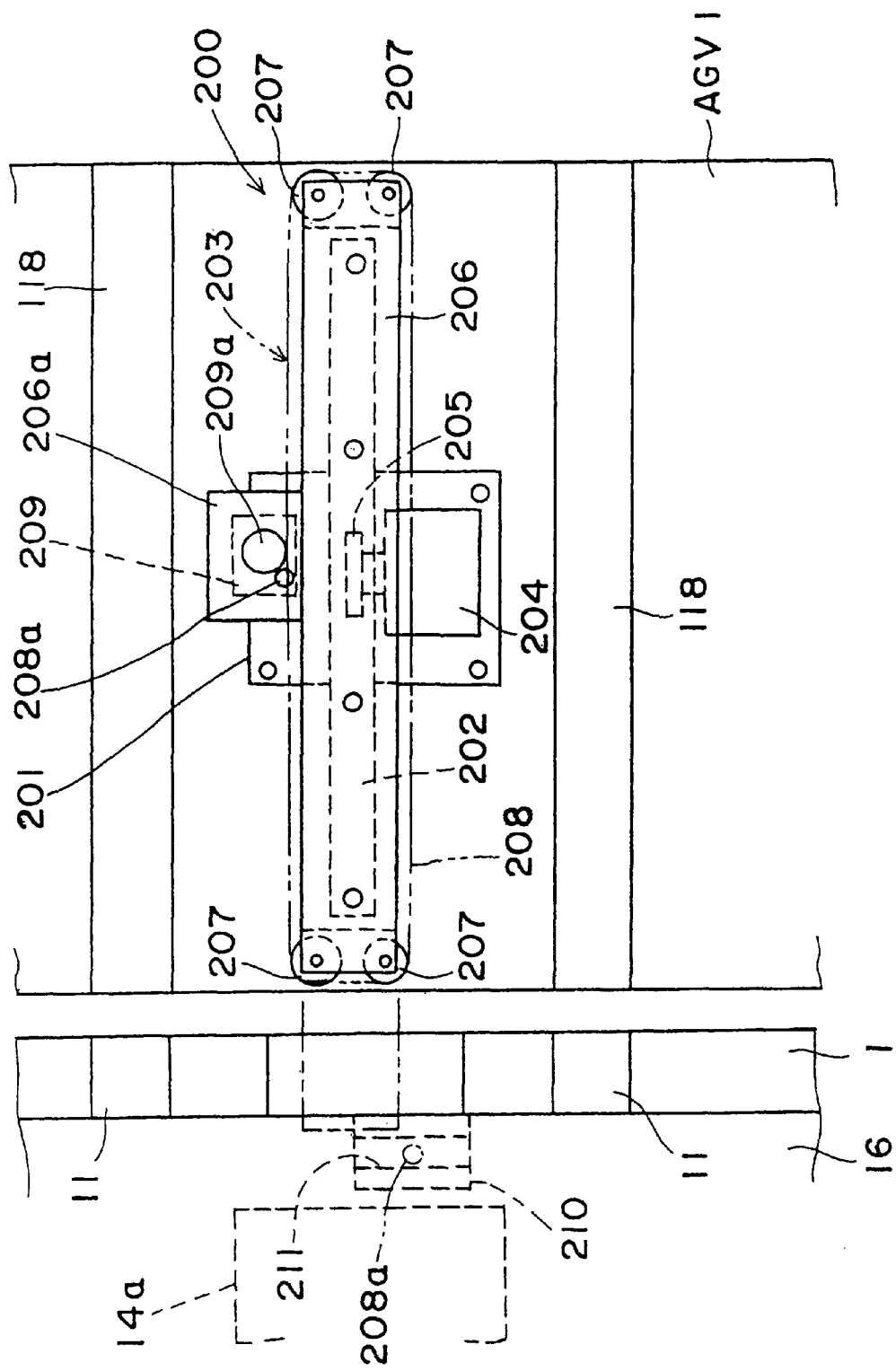
FIG. 8 is an enlarged plane view showing an automatic guided vehicle according to the present invention.

As shown in FIG. 8, on an upper surface of the automatic guided vehicle AGV1, a pair of straight guide rails 118 are provided through the entire width thereof so as to align with the pair of straight guide rails 11 provided on each of the machining lines 100 and 101. Similarly, two pair of straight guide rails 131 and 141 are respectively provided on upper surfaces of the waiting station 130 and the repairing station 140, which rails are the same construction as the straight guide rails 11 and 118. Accordingly, when the automatic guided vehicle AGV1 is brought alongside the waiting station 130 and the repairing station 140, the straight guide rails 118 of the automatic guided vehicle AGV1 are aligned with the straight guide rails 131 and 141 thereof, respectively.

On the upper surface of the automatic guided vehicle AGV1, a tool changer guide rail 119 for guiding the self-propelled truck 172 of the tool changer 171 is further provided through the entire width of the automatic guided vehicle AGV1, as shown in FIG. 1. When the automatic guided vehicle AGV1 is brought alongside the tool storage magazine 170, the tool changer guide rail 119 is aligned with a guide rail 174 of the tool storage magazine 170. Further, when the automatic guided vehicle AGV1 is brought alongside the machining line 100 or 101, the straight guide rail 118 and the tool changer guide rail 119 are aligned with the straight guide rail 11 and the tool changer guideway 81 provided thereon.

Referring back to FIG. 8, a loading mechanism 200 is mounted on the automatic guided vehicle AGV1 between the pair of straight guide rails thereof. This loading mechanism 200 comprises a guide frame 201, a rack shaft 202 supported by both side portion of the guide frame 201 in the Z-axis direction, and an endless chain mechanism 203 fixed on an upper surface of the rack shaft 202. Further, a pinion gear 205 provided onto an output shaft of a motor 204 is engaged with rack teeth formed on a lower surface of the rack shaft 202, so that the rack shaft 202 and the endless chain mechanism 203 mounted thereon can reciprocate in the first direction (X-axis direction) upon rotation of the pinion gear 205 driven by the motor 204.

The endless chain mechanism 203 has a rectangular chain guide plate 206 horizontally extending in the first direction, at four corners of which four sprockets 207 are rotatably supported, respectively, and further comprises a chain 208 wound onto the sprockets 207. On a central portion of the guide plate 206, a motor housing 206a is unitedly formed therewith to build in a motor 209 to which a drive sprocket 209a engaged with the chain 208.

Further, the chain 208 provides a pin 208a projecting therefrom. In each of the workpiece transfer unit 10, hooks 210 are respectively secured to lower surfaces at both end portions of the traveling member 13 in the X-axis direction (FIG. 8 shows only the hook 210 formed at the right end portion of the traveling member 13). A length of the hook 210 in the second direction (X-axis direction) generally coincides with a span of the chan 208 therein, and in case that the automatic guided vehicle AGV1 is brought alongside the machining line 100 or 101, the hook 210 is attached to the traveling member 13 at a position where it is shifted against a center of the chain 208 by about a half span thereof, as shown in FIG. 8. Furthermore, a groove 211 extending in the second direction is formed in the hook 210.

In a case of loading onto the automatic guided vehicle AGV1 the workpiece transfer unit 10 existing at the finishing point of the backward machining line 101 right-side thereof, a left end of the chain guide plate 206 is inserted upon rotation of the motor 204 under the hook 210 of the traveling member 13 and then, the chain 208 is counter-clockwise rotated by the rotation of the motor 209. With this rotation of the chain 208, the drive pin 208a comes into engagement with the groove 211 of the hook 210. After the engagement of the drive pin 208a with the hook 210 (i.e., the groove 211), the motor 204 is rotated in reverse and also the motor 209 is further rotated in the same direction. As a result of the rotation of the both motors 204 and 209, the workpiece transfer unit 10 is loaded onto the automatic guided vehicle AGV1.

At the completion of the loading operation onto the automatic guided vehicle AGV1, the both motors 204 and 209 are maintained with an electromagnetic brake. With this electromagnetic brake, the engagement of the drive pin 208a with the hook 210 is rigidly maintained, so that the workpiece transfer unit 10 on the automatic guided vehicle AGV1 is held thereon securely even when the automatic guided vehicle AGV1 moves along with the raceway truck 112.

In a case of injecting the loaded workpiece transfer unit 10 on the automatic guided vehicle AGV1 to the starting point of the forward machining line 100, the reverse operation is carried out against the above-described loading operation of the workpiece transfer unit 10 onto the automatic guided vehicle AGV1. In a case of inputting the workpiece transfer unit 10 from the waiting station 130 or the repairing station 140 onto the automatic guided vehicle AGV1, the motors 204 and 209 are operated so as to advance the chain guide plate 206 to the right side of the automatic guided vehicle AGV1 and also to rotate the chain 208 clockwise. In such a case, the drive pin 208a is engaged with the hook (not shown) formed at the left side of the workpiece transfer unit 10. Further, in a case of the loading operation the workpiece transfer unit 10 from one side (e.g., right side) of the automatic guided vehicle AGV1 onto the other side (e.g., left side) thereof, prior to this loading operation, the engagement of one hook 210 with the drive pin 208a is released and then, the drive pin 208a is engaged with the other hook 210.

The aforementioned control operations of the both motors 204 and 209 are performed based upon output signals from the PLC 120. Further, in the waiting station 130 and the repairing station 140, plural magnet plates (not illustrated) are respectively provided between the two pair of the straight guide rails 131 and 141 to configure the linear motor with the moving coil 14b of the traveling member 13, similarly to that on each of the machining lines 100 and 101.

Next, the operation of the first embodiment as described above will be now explained.

Input Workpiece to Machining Line and Collection Thereof

When a workpiece input command with a workpiece classification number "Wn" and a machining line number "Ln" is designated by the computer 181 of the main control unit 180 (described hereafter in detail), the PLC 120 controllably operates the loading-unloading mechanism 152 of the workpiece storage device 150 and one of the workpiece supply devices 160 and 161 in accordance with the workpiece input command. With this command, the loading-unloading mechanism 152 brings the workpiece Wp corresponding to the workpiece classification number Wn from the tridimensional workpiece pool 151, and then sets it onto one of the workpiece temporary loading tables 168a and 169a.

In general, the workpiece supply devices 160 and 161 stand by above the corresponding workpiece temporary loading tables 168a and 169a thereto, respectively. In response to the workpiece input command, after it is confirmed that the workpiece Wp is set onto the workpiece temporary loading table 168a or 169a, the workpiece supply device 160 or 161 releases the pallet set on the corresponding workpiece temporary loading table therefrom, and then sets it onto the workpiece temporary loading table 168b or 169c corresponding to the machining line 100 or 101 designated by the machining line number Ln.

As explained hereafter, in a case that a workpiece collection command with the workpiece classification number Wn and the machining line number Ln is instructed by the computer 181, the pallet P is collected from the workpiece temporary loading table 169b or 168c by the workpiece supply device 161 or 160 which exists thereon at the finishing end of the machining line 100 or 101 designated by the machining line number Ln, and is returned onto the workpiece temporary loading table 169a or 168a, with the PLC 120 controlling the workpiece supply device 161 or 160. Further, the pallet P returned on the workpiece temporary loading table 169a or 168a is returned by the loading-unloading mechanism 152, to the storage section of the tridimensional workpiece pool 151 in which the pallet P with the workpiece Wp designated by the workpiece classification number Wn has been initially stored, or to one of empty storage sections that is designated so as to store the workpiece Wp of the same workpiece classification.

Unit Input Control to Machining Line

The workpiece transfer unit 10 is in turn input to each of the machining lines 100 and 101 in accordance with a unit assign control program UACP (referring to FIGS. 9(A) and 9(B)) that is executed at a predetermined interval time by the computer 181 of the main control unit 180.

First, after the machining line is designated by a line number counter "LnC" in steps S1–S4, the processes following step S5 are executed about the designated machining line. For a start, the line number counter "LnC" is initialized to "1" in step S1. Herein, when it is judged in step S2 that the workpiece transfer units equal to or more than a predetermined number unit are already input to the machining line designated by the line number counter "LnC", in following step S3, the line number counter "LnC" is incremented by "1" (i.e., "LnC" is set to "2" from "1"), so that the next machining line is designated.

In a RAM (not shown) of the computer 181, a unit location table ULT shown in FIG. 12 is memorized therein. The unit location table ULT includes "classification number (two figures following letter "U")"of the workpiece transfer units 10 mounted on the waiting station 130, the repairing station 140, the first and second automatic guided vehicles AGV1 and AGV2, and each of the machining lines 100 and 101, "order ("TOP", "NEXT" and "LAST") from the end side of each of machining lines, and "address (address of the spindle head 60 that is represented by two figures)" on each of the machining lines, and the computer 181 successively updates the unit location table ULT. In step S2, it is judged whether or not a number of the workpiece transfer units 10 equal to or more than the "N" units (e.g., three units in this embodiment), i.e., "BUSY" or not, so that the workpiece transfer units 10 equal to or more than the "N" units cannot be input into the designated machining line.

Further, this program UACP is finished when it is judged in step S4 that the ordinal number "M+1" over the "M" indicative of the last machining line is designated as numbering sequentially from the first machining line 100 shown in FIG. 1 to the next machining line 101. Thus, if the machining line designated by the line number counter LnC is not busy, the processes following step S5 are performed to all of machining lines in turn.

In step S5, the computer 181 determines the classification of the workpiece Wp to be next input in accordance with a machining schedule table MST shown in FIG. 11 memorized in the RAM (not-illustrated). Further, the computer determines the workpiece transfer unit 10 to be used with reference to the unit location table ULT.

Now, when the forward line "L01" is designated, it is judged based upon the unit location table ULT that it is possible to input another workpiece transfer unit 10 thereto. In such a situation, the workpiece transfer unit 10 with the classification number "U20" arranged at the "TOP" of the waiting station 130 is designated based upon the unit location table ULT, and the workpiece Wp with the workpiece classification number "W01" is determined in accordance with the machining schedule table MST.

Thereafter, the processes of steps S6–S14 are executed. In step S8, the workpiece transfer unit 10 exiting on "TOP" at a loading side of the waiting station 130 is advanced to the loading position with the wireless command thereto. In following step S9, the first automatic guided vehicle AGV1 is moved alongside of the waiting station 130 by giving the command to the PLC 120, and the workpiece transfer unit 10 at the loading position is loaded onto the first automatic guided vehicle AGV1 by the loading mechanism 200 provided thereon. Further, it is judged whether the workpiece transfer unit 10 loaded on the automatic guided vehicle AGV1 coincides or not with that designated by the classification number "U20" in step S10. If so (i.e., "YES"), the machining line number "Ln" and the workpiece classification number "Wn" are wirelessed to the workpiece transfer unit 10 with the classification number "U20", and the workpiece input command with this information (Ln, Wn) is given to the PLC 120 (step S11).

The PLC 120 controllably operates according to the input command with the machining line number "Ln" and the workpiece classification number "Wn", the loading-unloading mechanism 152 and the workpiece supply device 160. With the operation of the PLC 120, the workpiece Wp designated by the workpiece classification number "Wn" (in this operation explanation, "W01") is carried onto the workpiece temporary table 168a from the workpiece storage pool 150 by the loading-unloading mechanism 152. Further, the workpiece Wp on the workpiece temporary table 168a is set onto the workpiece temporary table 168b at the starting point of the machining line designated by the machining line number "Ln" (herein, the forward machining line 100 with the machining line number "L01"). Simultaneously with this operation, the CNC unit 51 of the workpiece transfer unit 10 designated by the classification number "U20" memorizes in its memory (not shown) the workpiece classification number "Wn" and the machining line number "Ln".

Next, the automatic guided vehicle AGV1 is brought alongside of the starting end of the designated machining line (herein, the forward machining line 100 with the machining line number "L01") when the command is given to the PLC 120 by the computer 181 of the main control unit 180, and the workpiece transfer unit 10 with the classification number "U20" is input onto the starting end portion of the forward machining line 100 by the loading mechanism 200 mounted on the automatic guided vehicle AGV1 (step S12).

If the workpiece transfer unit 10 determined in step S5 is not located at the "TOP" of the waiting station 130, in step S15, the automatic guided vehicle AGV1 is brought alongside of the repairing station 140 to escape thereto the workpiece transfer unit 10 on the automatic guided vehicle AGV1, according to the command to the PLC 120. Accordingly, in a case that it is confirmed in step S13 that the workpiece transfer unit 10 is already escaped to the repairing station 140, a escape unit return command is given to the PLC 120 and then all of the workpiece transfer units 10 temporarily escaped to the repairing station 140 by the automatic guided vehicle AGV1 are returned to the waiting station 130 (step S14).

Further, in a case that it is determined in step S7 that the workpiece transfer unit 10 not on the waiting station 130 is used, the processes following step S11 are executed in case that the designated workpiece transfer unit 10 exists on the automatic guided vehicle AGV1 ("YES" in step S16) and that the pallet P is not attached to the designated workpiece transfer unit 10 ("YES" in step S17). In such a situation, it is performed by the processes following step S11 that the designated workpiece transfer unit 10 on the automatic guided vehicle AGV1 output from backward machining line 101 is input to the forward machining line 100 again.

Figure 10:
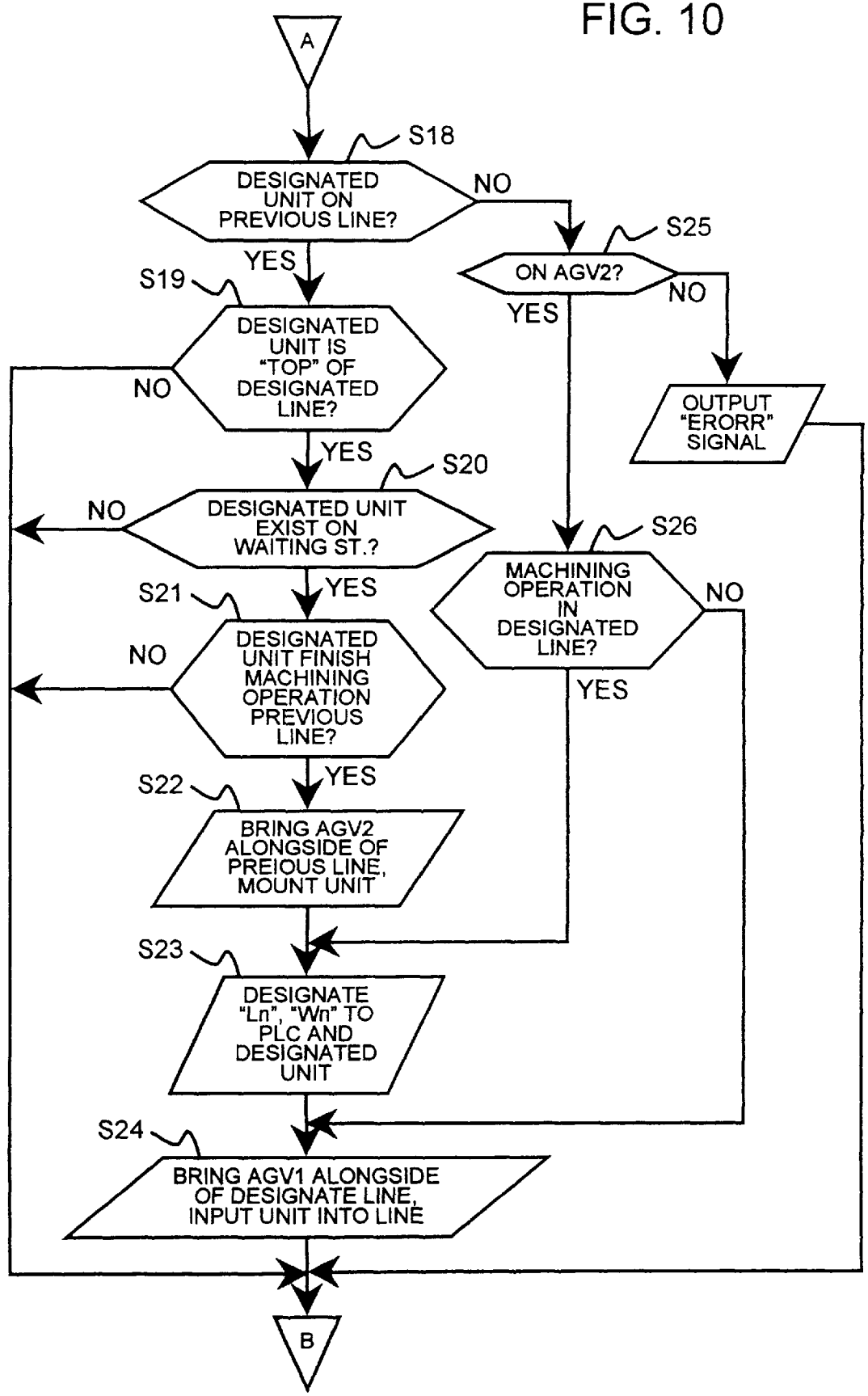
FIG. 10 is a flowchart showing another part of the unit assign control program shown in FIG. 9.

If a case that the machining line number "Ln" of the designated machining line is "even", i.e., the backward machining line 101 is designated, or if the designated workpiece transfer unit 10 does not exist on the waiting station 130 or the automatic guided vehicle AGV1 in a case that the forward machining line 100 is designated, the processes shown in FIG. 10 are executed.

In this embodiment, it is so designed that each of the backward machining lines 101 uses the workpiece transfer unit 10 output from the finishing end of the prior forward machining line 100 paired therewith. Further, the processes of steps S18–S24 are executed in case that one of the backward machining lines is designated in step S3, that the workpiece Wp to be next input is determined in step S5, e.g., to "W02" based upon the machining schedule table MST, and that the workpiece transfer unit 10 to be used is judged to the unit "U05" located on "TOP" of the prior machining line "L01" in accordance with the unit location table ULT.

In this case, the processes of steps S19–S21 are executed after the pallet P with the workpiece transfer unit 10 located on "TOP" of the prior machining line "L01" is released onto the workpiece temporary table 169b in which all of the machining operations are performed on the workpiece Wp in the prior machining line "L01". With this execution in step S22, the second automatic guided vehicle AGV2 is brought alongside of the finishing end of the prior machining line "L01" in accordance with the command to the PLC 120, and the workpiece transfer unit "U05" with the workpiece "W02" on the prior machining line "L01" is loaded onto the second automatic guided vehicle AGV2 by the loading mechanism 200 thereof. Next, the machining line number "Ln" and the workpiece classification number "Wn" are transmitted and memorized in the memory of the CNC unit 50 mounted on the designated workpiece transfer unit "U05".

Moreover, the processes following step S23 are executed in case that the designated workpiece transfer unit 10 exists on the second automatic guided table AGV2, and the machining operation is carried out in the designated machining line ("YES" in both steps S25 and S26). If it is judged in step S26 that the machining operation is not performed in the designated machining line under the condition that the designated workpiece transfer unit 10 is already mounted on the second automatic guided vehicle AGV2 (judged as "NO"), only the process in step S24 is executed. To the contrary, if the designated workpiece transfer unit 10 does not exist on any of the prior machining line of that to be next input and the second automatic guided vehicle AGV2, the process advances to step S27 to display "ERROR" and then returns to step S3.

Unit Transfer Control

Figure 13:
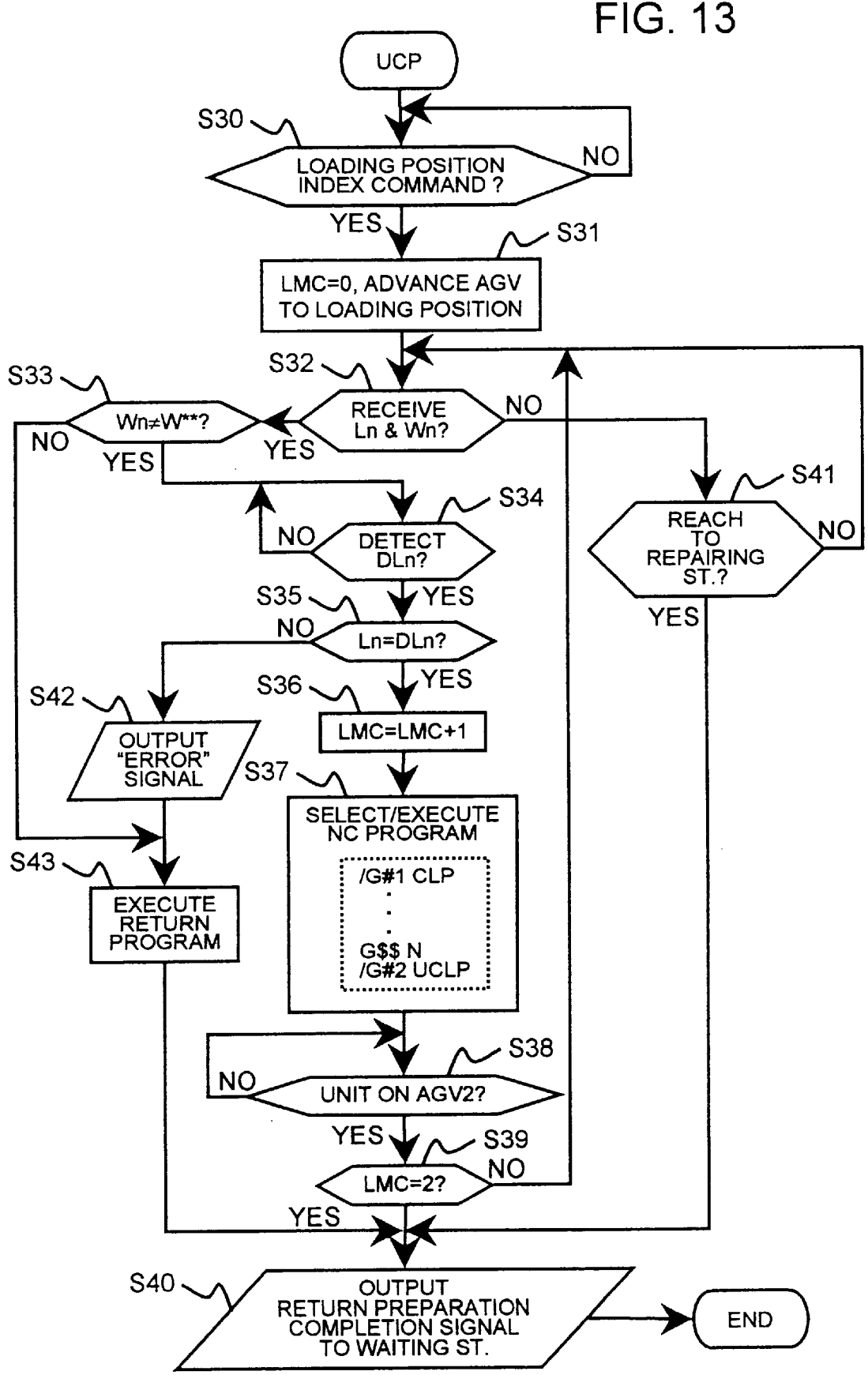
FIG. 13 is a flowchart showing a unit transfer control program executed in a CNC unit of a unit control unit.
Figure 14:
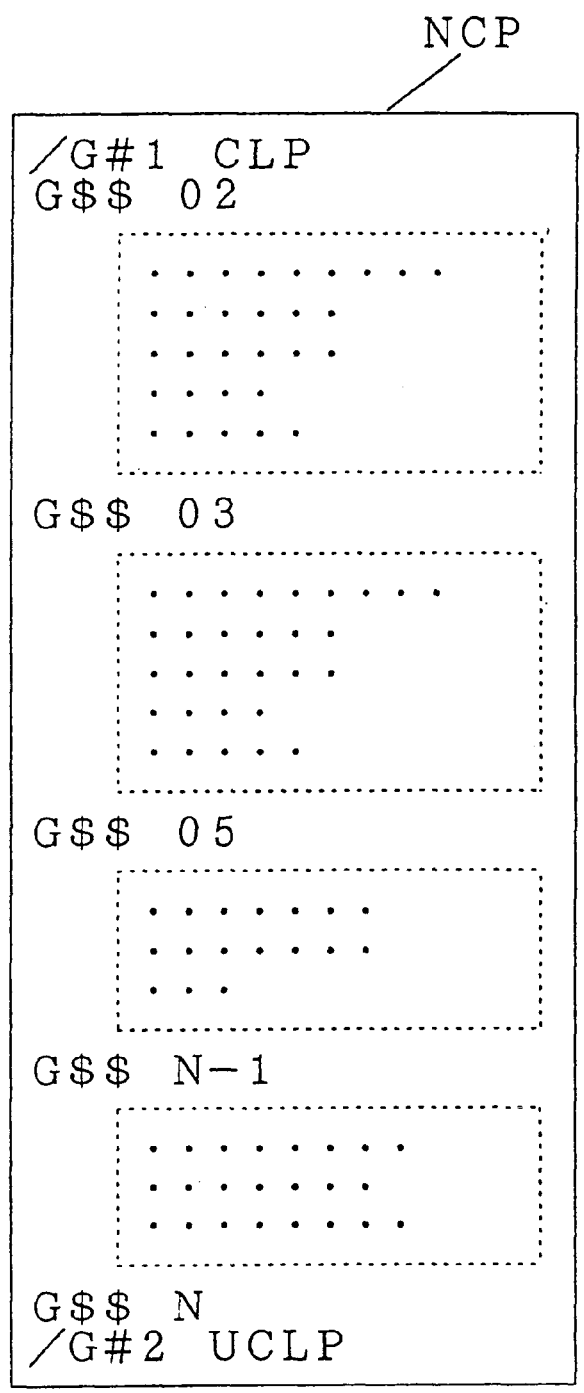
FIG. 14 is an explanation sample showing an NC program executed in the CNC unit.

The CNC unit 51 in the unit controller 50 mounted on each of the workpiece transfer units 10 memorizes in the memory (not illustrated) a unit control program UCP and an NC program NCP respectively shown in FIGS. 13 and 14, in which the NC program NCP is executed under control of the unit control program UCP.

Figure 9:
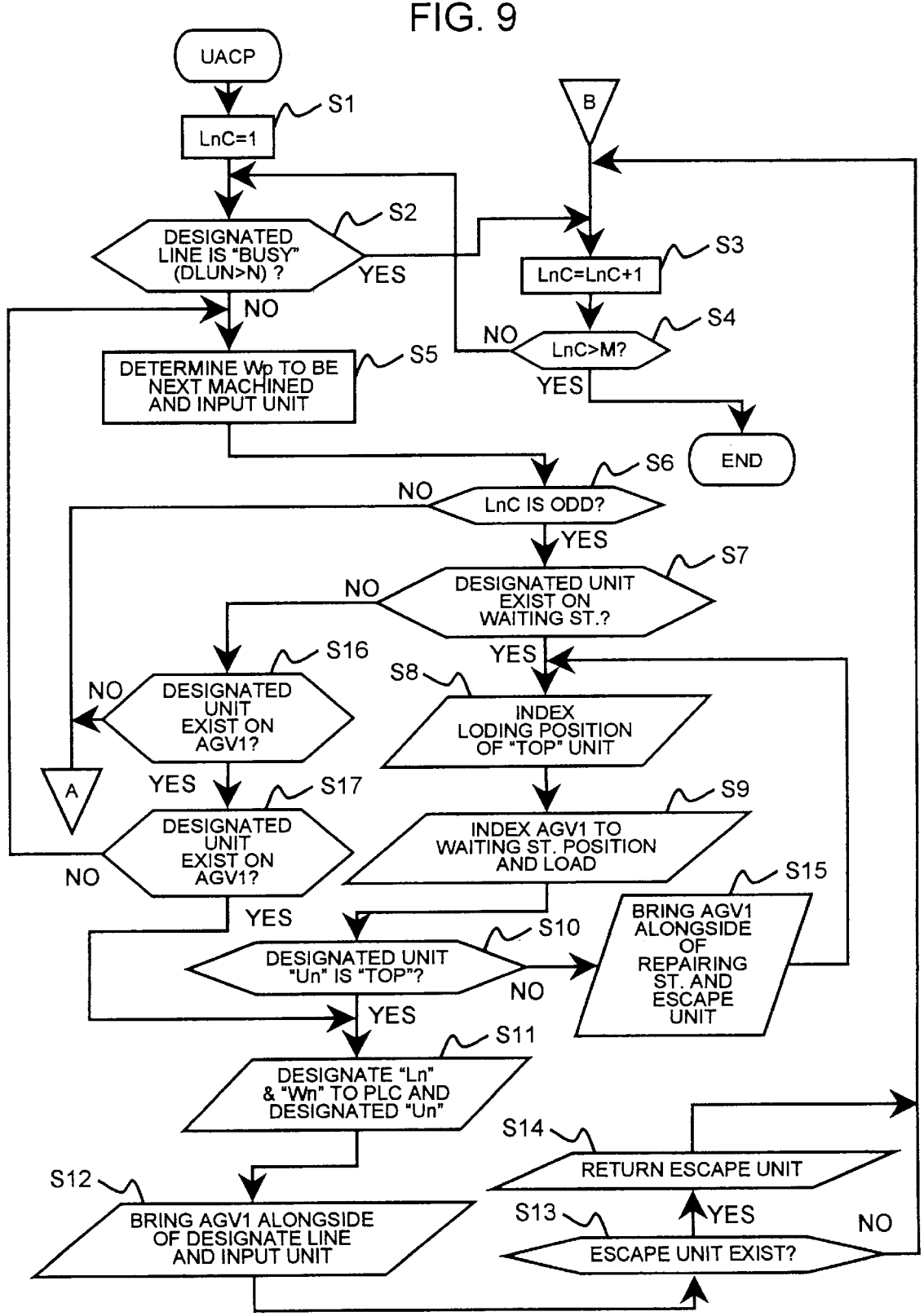
FIG. 9 is a flowchart showing a part of a unit assign control program executed in a computer of a main control unit.

Now, in step S8 shown in FIG. 9, after it is in step S30 judged that the CNC unit 51 receives a loading position index command transmitted from the main control unit 180, the CNC unit 51 clears a line memory counter LMC in its memory and the workpiece transfer unit 10 mounting the CNC unit 51 is advanced to the loading position of the first automatic guided vehicle AGV1 by a drive of the linear motor 14 (step S31). With this operation, the workpiece transfer unit 10 is loaded on the first automatic guided vehicle AGV1. However, if the workpiece transfer unit 10 loaded on the first automatic guided vehicle AGV1 is not the designated one, the process in step S15 shown in FIG. 9 is executed, so that the workpiece transfer unit 10 (not designated) is loaded onto the repairing station 140 by the first automatic guided vehicle AGV1. After it is confirmed that the loading operation of the workpiece transfer unit 10 onto the repairing station 140 is finished in step S41 divided from step S32, a signal indicative of that the first automatic guided vehicle AGV1 is already returned alongside of the waiting station 130 is transmitted to the main control unit 180 (step S40), and then this program UCP is finished.

On the other hand, in case that the workpiece transfer unit 10 mounted on the first automatic guided vehicle AGV1 is the designated one, the CNC unit 51 confirms the reception of the machining line number "Ln" and the workpiece classification number "Wn" (step S32), and it is in step S33 whether the received workpiece classification number is or not "W**", i.e., whether the workpiece Wp to be machined exists or not. In a general case, the workpiece Wp to be machined is assigned to the workpiece transfer unit 10 input into the forward machining line 100, so that it is confirmed whether an arrival machining line number "DLn" next reaching is detected or not (step S34).

A classification code reader (not shown) is provided on each of the workpiece transfer units 10. This reader senses classification code element ID like a bar-code shown in FIG. 15, fixedly arranged on the line base 1 at a workpiece receiving position where the workpiece transfer unit 10 is aligned in the Z-axis direction by the first automatic guided vehicle AGV1 with the workpiece temporary table (e.g., 168b) located at the starting end of the designated machining line. With this reading of the classification code element ID, the arrival machining line number "DLn" is confirmed.

When it is confirmed that the arrival machining line number "DLn" coincides with the designated line number "Ln" in step S35, the CNC unit 51 of the workpiece transfer unit 10 increments the line memory counter LMC and memorizes that the machining operation to be performed is that carried out on the forward machining line 100 (step S36). In successive step S37, the NC program NCP specialized by the designated workpiece classification number "Wn" is selected from a plurality of the NC program NCP memorized in the memory, and then the selected NC program NCP is executed by the CNC unit 51.

FIG. 14 represents an example of the plural NC programs NCP memorized in the CNC unit 51 of the workpiece transfer unit 10. The first block of this NC program NCP shows a sub-program for loading the pallet P, and the loading operation of the pallet P is performed with the execution of this sub-program.

In such a case, the workpiece transfer unit changes from a transfer operation attitude to a workpiece clamping attitude. Namely, it is so controlled that the second movable member 16 is advanced by the servomotor 21 upward the workpiece temporary table 168b to concentrically correspond the taper hole of the second index table 42 therewith, and that the workpiece supporting device 40 is successively moved downwardly by the servomotor 30. As a result, the taper hole of the second index table 42 comes into contact with the shank portion 44 of the pallet P loaded on the workpiece temporary table 168b. Thereafter, the pallet P is clamped to the second index table 42 by the operation of the clap mechanism 42a, and the second and third movable members 16 and 27 revert to the transfer operation attitude by the servomotors 21 and 30.

The transfer operation attitude means attitudes shown in FIGS. 2–4, i.e., the second and third movable members 16 and 27 are respectively positioned at a retractive end position and at an upper end position thereof, and also the first and second index tables 41 and 42 are respectively maintained by 0 (zero) degree of rotational phase angle indicative of the original position.

When the pallet support operation is finished as described above, the workpiece transfer unit 10 is indexed at the front of the spindle head 60 to be used. According to the NC program NCP shown in FIG. 14, the programmed machining operation are performed at spindle head addresses "02", "03" and "05" by the machining movements of the workpiece transfer unit 10, respectively.

Figure 15:
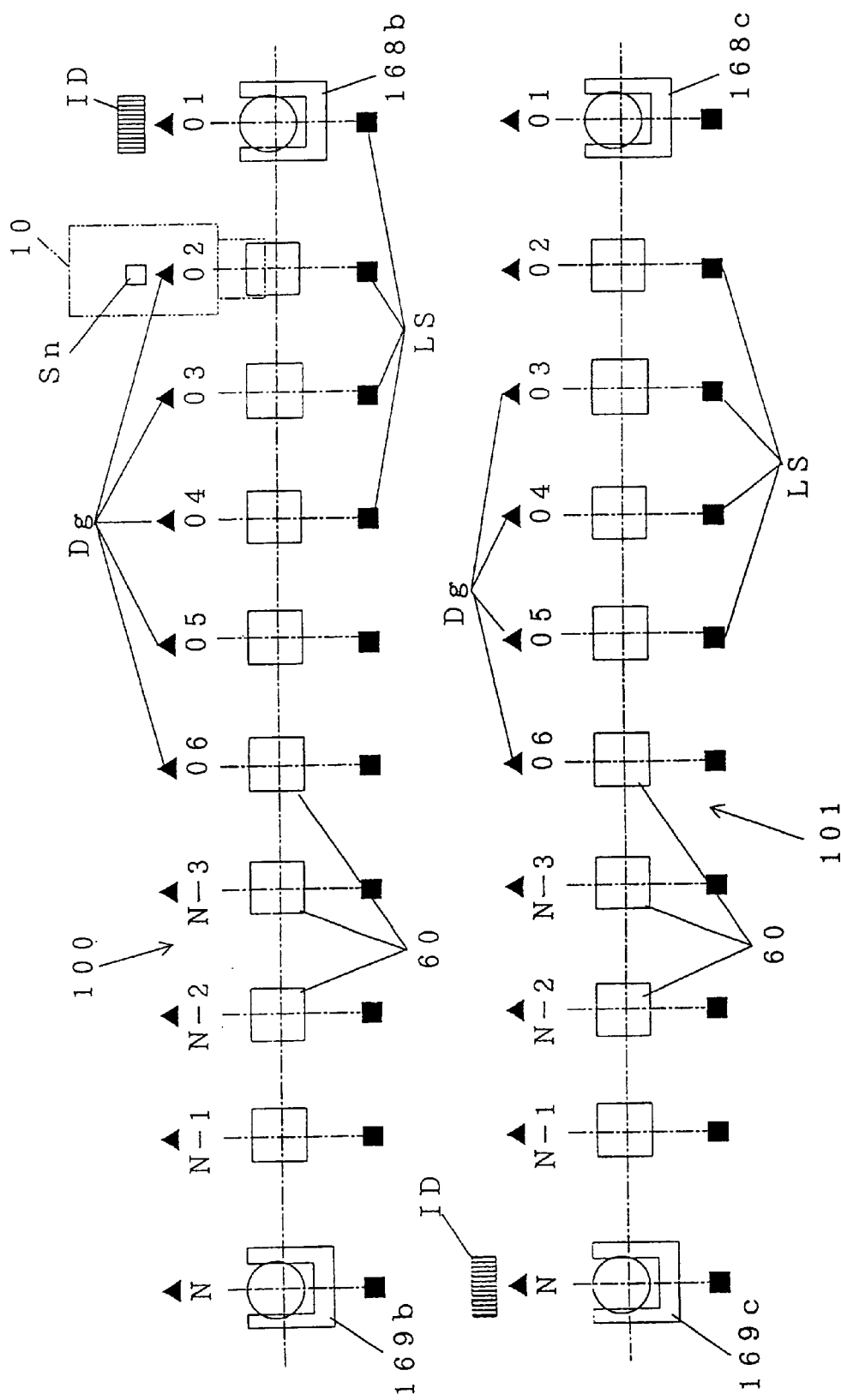
FIG. 15 is an explanation diagram showing an address of the tool spindle head spaced along with the machining line.

In this embodiment, as shown in FIG. 15, a sensor Sn is provided in each of the workpiece transfer unit 10. When the workpiece transfer unit 10 reaches at the front of each of the spindle heads 60, the sensor Sn is responsive to a dog Dg provided on each of the spindle heads 60. The CNC unit 51 of the workpiece transfer unit 10 increases a counted value by means of a counter (not shown) every time when the sensor Sn is responsive to each of the dogs Dg. The CNC unit 51 indexes the workpiece transfer unit 10 at the front of the spindle head 60 having the objective tool T designated by the NC program NCP, by monitoring the counter.

At each of the indexed positions, NC program portion defined under each of index position command data (referred to as "machining program" hereinafter) is executed. In the NC program NCP shown in FIG. 14, each of the blocks having a "G" code indicative of "G**" corresponds to the index position command data, and the plural data blocks enclosed with a broken line thereunder correspond to the machining programs.

FIG. 14 shows the machining program with the omission of its actual program. However, the machining program contains the data blocks for controlling at least one of the linear motor 14 for feeding in the X-axis direction, the servomotor 21 for feeding in the Z-axis direction, the servomotor 30 for the Y-axis direction feed, and the servomotors 47 and 48 for indexing the first and second index tables 41 and 42.

At each of the indexed positions, the CNC unit 51 drives in accordance with the machining program, the first, second and third movable members 13, 16 and 27, in order to move the workpiece Wp attached to contact the pallet P on the second index table 42 with the tool T of the spindle head 60 positioned at the front of the workpiece transfer unit 10. In this position, the machining operation is performed with respect to this tool T by relatively moving the workpiece Wp to the tool T. In a case that the tool T is an end mill, the machining operation forms a surface on the workpiece Wp defined by a straight line or a curve line. Further, if the tool T is a drill, the machining operation drills one or more hole on the surface of the workpiece Wp.

After the machining operation is finished to one surface of the workpiece Wp, the first and second index tables 41 and 42 are operated in accordance with the surface to be next machined. Thus, the machining operation by the tool T of the spindle head 60 addressed at the head address "02" is performed to five surfaces without the surface to which the pallet P is attached.

Successively to the completion of the machining operation by the first tool T, the first movable member 13 is rapidly fed at the front of the spindle head 60 located at the head address "03" with the execution of the next index position command data "G$$ 03". At the indexed position of the head address "03", the machining operation is carried out by the second tool T. In this machining operation, the first, second and third movable members 13, 16 and 27, and the first and second index tables 41 and 42 are appropriately driven in accordance with the command of the CNC unit 51.

According to the example of the NC program NCP shown in FIG. 13, subsequently to the machining operation performed by the second tool T of the spindle head 60 with the head address "03", the workpiece Wp supported on the workpiece transfer unit 10 is machined by the tool T of the spindle head 60 located at the head address "05". Finally, the machining operation is performed by the tool T of the last spindle head 60 addressed by the head address "N−1".

One of the features in this embodiment is in that the indexed position that the workpiece transfer unit 10 is indexed at the front of the selected spindle head 60 is programmed as an original point in the machining program. Namely, the machining operation starts from the indexed position as the original point, so that the machining accuracy of the workpiece Wp cannot suffered by the accumulation of feed errors and thermal displacement between the spindle heads 60. Further, the machining operation on each of the spindle heads 60 is regarded as that performed by sole machine tool, so that the preparation of the machining program therefor can be simplified.

During the machining operation performed at each of the indexed positions, the CNC unit 51 uses a detected signal from the reader 59 shown in FIGS. 2 and 5 as a position signal for the feedback in the X-axis direction. When each of the workpiece transfer units 10 is indexed at the front of the objective spindle heads 60, the detected signal from the reader 59 is zeroed by a signal from the sensor Sn sensitive to the dog Dg. Namely, every time when the workpiece transfer unit 10 is reached to the indexed position (i.e., the original point for the machining operation) at the front of the spindle heads 60, the detected signal of the reader 59 is corrected to "zero" by the inside process of the CNC unit 51. Thus, it is used such a magnetic scale that is relatively short and less expensive for covering only a movable range of the first movable member 13 with respect to each of the spindle heads 10, as the magnetic scale 58 provided on each thereof. With this construction, the control error by the impreciseness of the feedback signal, i.e., the decline in the machining accuracy can be reduced. On the other hand, feedback signals for the other axes to be controlled are detected by the encoders 22 and 31, for example, attached to each of servomotors.

At the moment of the completion in all of the machining operations on the forward machining line 100, the workpiece transfer unit 10 is indexed at a rapid feed to the front of the workpiece temporary table 169*b* arranged at the finishing end of the forward machining line 100, in accordance with the execution of the data block in which "G$$ N" of the NC program NCP in FIG. 14 is described. Thereafter, the reverse operation against the aforementioned pallet loading operation to the workpiece temporary table 168*b* is carried out with the execution of the data block in which pallet release "/G#2 UCLP" is defined.

With this operation, the pallet P holding the machined workpiece Wp is released to the workpiece temporary table 169*b*, and the workpiece transfer unit 10 is returned to the transfer operation attitude at the front of the workpiece temporary table 169*b*. This transfer attitude is same as that in a state when the workpiece is input to the starting end of the forward machining line 100.

As described above, the CNC unit 51 increments the inside counter means every time when the sensor Sn shown in FIG. 15 is sensitive to the dog Dg while the workpiece transfer unit 10 travels on the forward machining line 100, and its counted value is wireless-communicated with the computer 181 of the main control unit 180. Hereby, the main control unit 180 discerns the location of the workpiece transfer unit 10 on each of the machining lines, and the unit location table ULT is renewed by its location information.

When the workpiece transfer unit 10 reaches at the finishing end of the forward machining line 100, i.e., the head address "N" defining the address of the workpiece temporary table 169*b*, the counted value of the unit location counter means in the CNC unit 51 is transmitted to the main control unit 180 by wireless. By this transmission of the counted value, the main control unit 180 discerns the counted value as a line output command, and makes the PLC 120 to bring the second automatic guided vehicle AGV2 alongside of the finishing end of the forward machining line 100, in accordance with the line output command.

In such a case, the transfer operation of the second automatic guided vehicle AGV2 alongside of the forward machining line 100 is performed by the PLC 120 provided that the other workpiece transfer unit 10 withdrawn from the other forward machining line 100 is not mounted already on the second automatic guided vehicle AGV2. Successively, the workpiece transfer unit 10 located at the finishing end of the forward machining line 100 is loaded onto the second automatic guided vehicle AGV2 by the loading mechanism 200 provided thereon. As a normal routine, the second automatic guided vehicle AGV2 is brought alongside of the starting end of the backward machining line 101 paired with the forward machining line 100 to input the workpiece transfer unit 10 into the backward machining line 101.

Referring back to the flowchart in FIG. 13, in case that it is confirmed by the CNC unit 51 on the workpiece transfer unit 10 that the workpiece transfer unit 10 is loaded onto the second automatic guided vehicle AGV2 (step S38), it is judged in successive step S39 whether the value in the line memory counter LMC is or not incremented to "2", i.e., whether the machining operation on the backward machining line 101 is completed or not. In this case, it is judged as "NO" in step S39, the process is returned to step S32. In step S32, it is judged whether the backward machining line number "Ln" and the workpiece classification number "Wn" are designated by the main control unit 180. If the judgement in step S32 is "YES", the NC program NCP corresponding to the designated workpiece classification number "Wn" is selected again through the processes of steps S33–S36. This selected NC program is executed similarly to the aforementioned machining operation on the forward machining line 100. After the pallet P is kept to be released on the workpiece temporary table 168*c* arranged at the finishing end of the backward machining line 101, the processes advance from step S38 through step S39 to step S40. In step S40, a return preparation completion signal to the waiting station 130 is transmitted to the main control unit 180.

In general, the workpiece transfer unit 10 in which the machining operation is carried out on the forward machining line 100 is so scheduled by the main control unit 180 that the other machining operations on the other workpiece Wp are performed in the backward machining line 101. However, in a case that the machining operation on the backward machining line 101 is not instructed to the workpiece transfer unit 10, i.e., when the CNC unit 51 on its workpiece transfer unit 10 discerns that the workpiece classification number selected in step S33 is "W", that is the workpiece Wp to be machined does not exist, the processes of steps S33–S43 and S40 are executed. In step S43**, a return program memorized in the memory is selected to execute it.

With this execution, even if the pallet P is set on the workpiece temporary table 169c arranged at the starting end of the backward machining line 101, the workpiece transfer unit 10 is moved in its backward machining line 101 rightward of FIG. 1 without loading its pallet P. When the workpiece transfer unit 10 reaches at the finishing end of the backward machining line 101, i.e., the return program is finished, whereby the return preparation completion signal to the waiting station 130 is transmitted to the main control unit 180 in step S40.

In a case that workpiece Wp on the pallet P mounted at the starting end of the forward machining line 100 is continuously machined in backward machining line 101, for example, the workpiece Wp to be machined is of the workpiece classification number "W02" or "W04" registered in the machining schedule table MST in FIG. 11, the CNC unit 51 of the workpiece transfer unit 10 traveling on the forward machining line 100 executes in step S37 the NC program NCP with the elimination of the pallet release command "/G#2 UCLP" in the last block by a block delete function. On the other hand, when the NC program NCP is executed for the successive machining operation in the backward machining line 101 in step S37, the pallet loading command "/G#1 CLP" in the first block is eliminated by the block delete function similarly.

Hereby, the workpiece transfer unit 10 on which the workpiece Wp is mounted with the designation of the continuous machining operation in such forward and backward machining lines 100 and 101, is input onto the backward machining line 101 by the second automatic guided vehicle AGV2, without releasing the pallet P onto the workpiece temporary table 169b located at the finishing end of the forward machining line 100. Successively, the machining operation is performed at each of the indexed positions designated by the NC program NCP in accordance with the machining program, without the workpiece loading operation at the starting end of the backward machining line 101. Besides, the process in step S42 is executed when the workpiece transfer unit 10 is input into the machining line different from that designated for transmitting an error signal to the main control unit 180, and then the return program is executed in successive step S43.

Unit Interval Control

Figure 16:
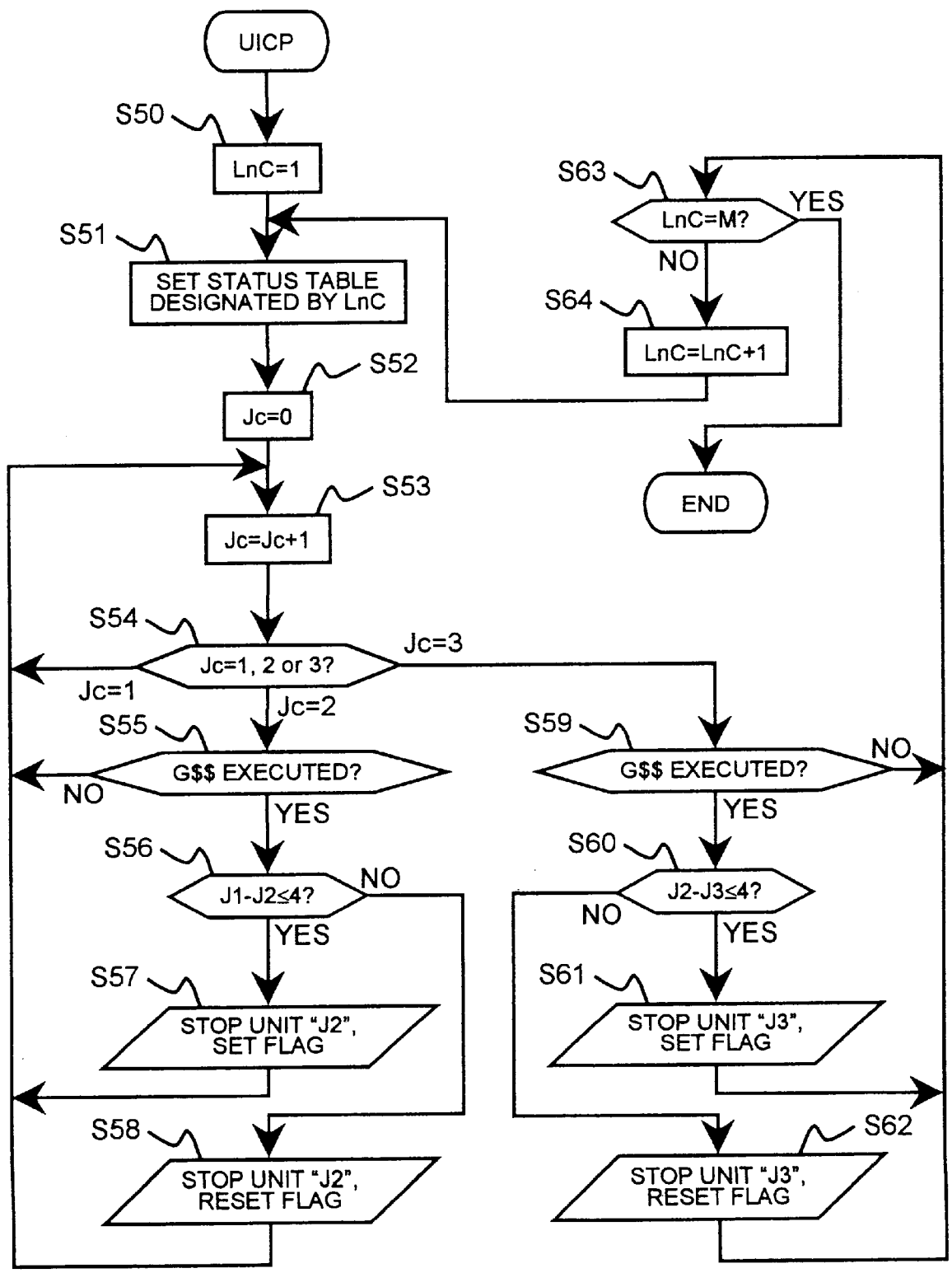
FIG. 16 is a flowchart showing a unit interval control program executed in the computer of the main control unit.

FIG. 16 shows a unit interval control program UICP executed by the computer 181 of the main control unit 180 at a predetermined interval time. With the execution of this program, it is so controlled that each of the plural workpiece transfer units 10 contemporaneously traveling on each of the machining lines 100 and 101 does not interfere or collide with an antecedent workpiece transfer unit 10. In this embodiment, as described above with reference to the flow-chart of the unit assign control program shown in FIGS. 9(A) and 9(B), the unit number of the workpiece transfer unit 10 contemporaneously used in each of the machining lines is limited, for example, to three units. Therefore, the unit interval control program UICP controls an approximation interval between each of the following and the antecedent workpiece transfer units 10.

In steps S50–S53, first, the forward machining line 100 with the machining line number "L01" is designated, and also the top antecedent workpiece transfer unit 10 traveling thereon is restricted. In step S54, after it is confirmed that the workpiece transfer unit 10 designated by an order counter "Jc" is "TOP" (Jc=1), the process is returned to step S53, and the next antecedent workpiece transfer unit 10 is restricted (step S54). In this case, when the second (next) workpiece transfer unit 10 is not operated, i.e., nothing is registered to a section assigned to the line number "L01" of the unit location table ULT in FIG. 12, or when it is confirmed that the second workpiece transfer unit 10 does not travel at a rapid feed rate toward the next objective spindle head position during the machining operation at a certain spindle head position (step S55), the process is returned to step S53 again.

When the second workpiece transfer unit 10 is transferred toward the objective spindle head 60, it is judged in step S56 that a predetermined number of head intervals is maintained between the first and second workpiece transfer units 10. In this embodiment, it is controlled so that the spindle head 60 equal to or more than three heads exists between the first and second workpiece transfer units 10. This judgement is performed with the subtraction of the head address data of the next workpiece transfer unit from that of the top workpiece transfer unit, with reference to the location of the workpiece transfer unit 10 traveling on the machining line designated by the line number counter "LnC" by the unit location table ULT shown in FIG. 12. If the result of the subtraction is "4≧", the spindle head 60 existing between the both workpiece transfer units is equal to or less than three heads. In this case, a traveling stop flag is set to the second workpiece transfer unit, and a traveling stop command is wirelessed to the CNC unit 51 of the second workpiece transfer unit 10 while the traveling stop flag is set thereto (step S57).

The CNC unit 51 receiving the traveling stop command, for example, makes the set value of a feed rate override function from 100% (general) to about 0% or to 0%, so that the rapid feed rate of the workpiece between the spindle heads is decelerated to about zero or is stopped.

On the other hand, if the spindle head 60 existing between the both workpiece transfer units is more than three heads, the traveling stop command to the second workpiece transfer unit is reset, and a traveling stop cancel command is given to the CNC unit 51 mounted on the second workpiece transfer unit 10 (step S58). In this case, since the feed rate override value in the CNC unit 51 is reset to 100%, the second workpiece transfer unit 10 is started to travel at the rapid feed rate again, or the moving coil 14b of the linear motor 14 is controlled so as to keep the prior rapid feed rate traveling state.

If it is confirmed that the order counter "Jc" is "3", i.e., the last transfer unit 10 is designated, the processes in steps S59–S62 are further executed. In this case, when the operation of the last workpiece transfer unit 10 is not registered to the unit location table ULT, or when the machining program of the registered last workpiece transfer unit 10 is carried out at the indexed position of the objective spindle head 60, the process advances to step S63 described hereinafter. If it is confirmed that the last workpiece transfer unit 10 travels at rapid feed rate, the processes in steps S60–S62 are executed. With these processes, the CNC unit 51 of the last workpiece transfer unit 10 sets or resets the traveling stop flag in accordance with the command form the main control unit 180. The rapid feed of the last workpiece transfer unit 10 is decelerated to zero or about zero while the flag is set. As a result, it is controlled so that the spindle head 60 more than three heads exist between the last and second workpiece transfer units 10.

The processes in steps S63 and S64 are to perform the unit interval control on the other machining lines. Hereby, all of the workpiece transfer units 10 traveling on the all machining lines "L01–LM" are maintained to an adequate interval (more than three of the spindle head 60).

In this embodiment, the interval between the antecedent and following workpiece transfer units traveling on each of the machining lines is set to more than three of the spindle head 60. With this construction, each of the workpiece transfer units 10 traveling on each of the machining lines can be retracted toward the starting end by the maximum three from the objective spindle head 60 after the machining operation thereof. This retractive control is instructed by the NC program NCP. In a certain index data block, the data "G$$ 09" indicative of the head address "09" is defined, and the data "G$$ 06" indicative of the head address "06" defined in the following data block, for example. With this data arrangement, the retractive control can be performed.

Thus, each of the workpiece transfer units 10 is fed in one direction from the starting end to the finishing end in each of the machining lines as a whole. However, the workpiece transfer unit 10, as explained above, can be retracted by a few of the spindle head 60 in its feed operation, so that the machining operation using only the tool of the downstream spindle can be performed before that can be carried out with the tool of the upstream spindle head. Therefore, it is possible not only to design a specialized machining process but also to easily prepare an arrangement plan of the tool T attached to the spindle head 60 and the NC program NCP, whereby flexibility of the system can be further improved.

Starting Control of Tool Spindle

Figures 17, 18:
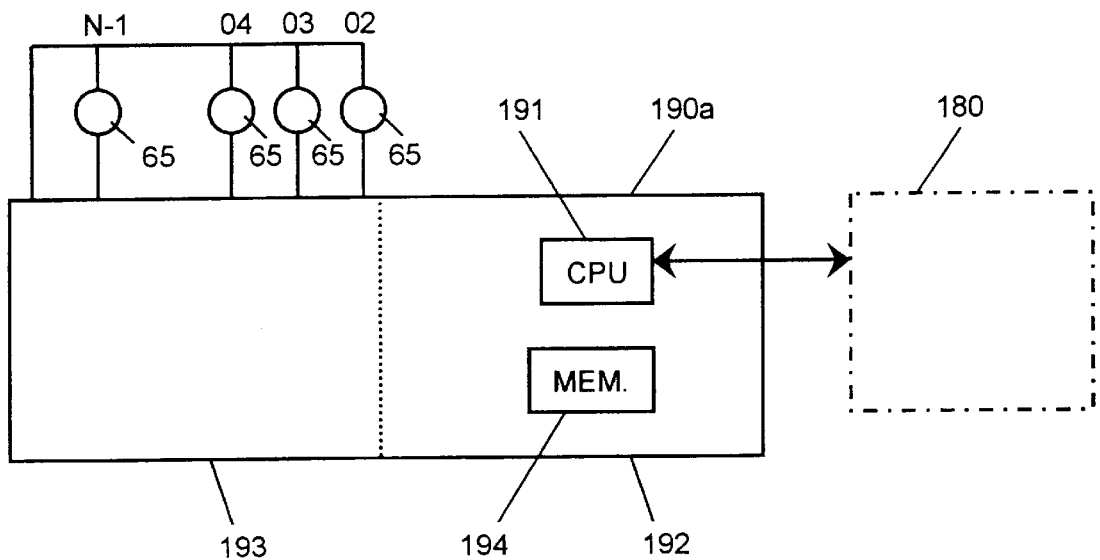
FIG. 17 is a block diagram showing the detail of a main tool spindle control unit arranged in each of the machining lines.
FIG. 18 is an explanation diagram showing a machining process table memorized in a memory of the main tool spindle control unit.

FIG. 17 shows an embodied construction of the tool spindle drive control unit 190*a* provided in each of the machining lines 100 and 101. The drive control unit 190*a* is composed of a drive control unit 192 including a CPU 191*a* connected to the main control unit 180 through a communication control unit (not shown), and a spindle driving unit 193 receiving a command from the drive control unit 192, in which a memory 194 is attached to the CPU 191*a*. In the memory 194, there is memorized a machining process table MKT shown in FIG. 18 in which machining process of each of the workpiece classification in respective workpiece Wp is registered as the head address on each of the machining lines 100 and 101. The address data is prepared based upon the NC program shown in FIG. 14 of each of the workpiece classifications.

Based upon the information of the machining process table MKT in the memory 194 and the location data of the workpiece transfer unit 10 input in its machining line which data is renewed by the communication with the main control unit 180, the CPU 191*a* stops supplying the power to the driving motor 65 of the spindle head 60 every completion that its machining operation is performed by each of the workpiece transfer units 10 using one spindle head. At the same time, the CPU 191*a* instructs to the spindle driving unit 193 so as to operate the driving motor 65 of the spindle head 60 in which the next machining operation is performed by indexing the workpiece transfer unit 10 to the next indexed position.

Namely, the driving motor 65 of the next objective spindle head 60 is operated at a generally same time when each of the workpiece transfer units 10 starts the rapid feed to the next objective spindle head 60. Until the workpiece transfer unit 10 is indexed at the front of the next objective spindle head 60, the rotational speed of the driving motor 65 reaches to an adequate rotational speed corresponding to the tool T attached to the tool spindle 66 of the next objective spindle head 60.

Hereby, it is possible to gradually increase the rotation of the next spindle head 60 by harnessing a time period while the workpiece transfer unit 10 is traveled from the present spindle head 60 to the next spindle head 60 used for the machining operation. On the other hand, it is possible to gradually decrease the rotational speed of the spindle head 60 under a general state of a natural stop. As a result, the use and rotational accuracy for a long time in the spindle head 60 of this embodiment can be ensured compared with a conventional machining center in which the rotation of the spindle head is rapidly increased and decreased.

Figure 19:
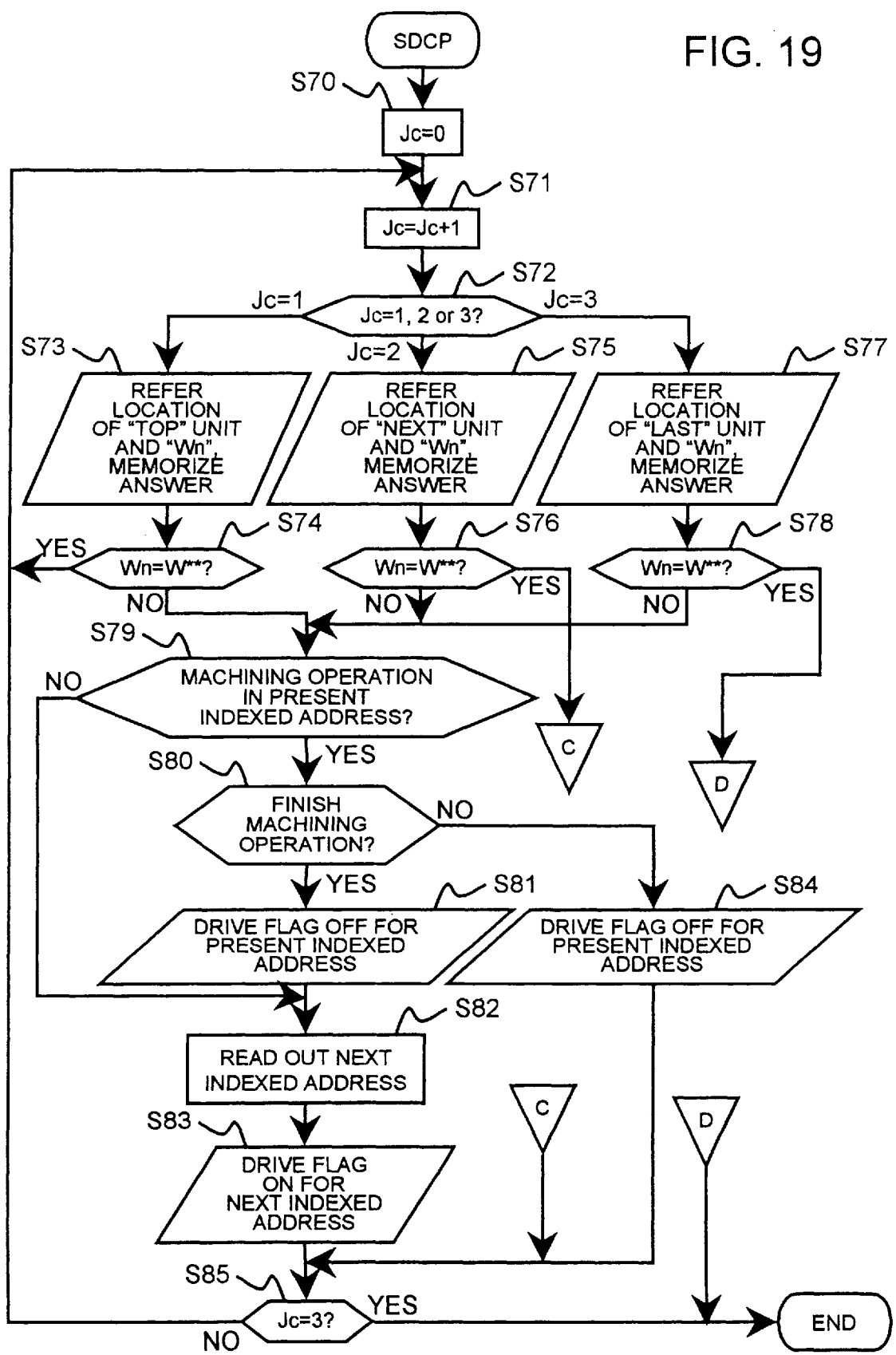
FIG. 19 is a flowchart showing a tool spindle drive control program executed in a CPU of a tool spindle head control unit.

FIG. 19 shows a spindle control program SDCP executed by the CPU 191*a* for controlling the drive of the aforementioned spindle head 60. In steps S70–S72, the workpiece transfer unit 10 input into own machining line is specified by the order counter "Jc". When "Jc" is set to "1", the location of the top workpiece transfer unit 10 on the machining line and the workpiece number attached thereto are referred to the main control unit 180 by the execution of steps S72 and S73. By this reference, the workpiece classification number "Wn" and the location address of the workpiece transfer unit 10 are temporarily memorized in a memory area of the memory 194 provided for the workpiece transfer unit, with reference of the main control unit 180 to the machining schedule table MST in FIG. 11 and the unit location table ULT in FIG. 12.

In this case, when it is replied from the main control unit 180 that the workpiece classification number is "Wn=" (step S74), i.e., when any of the classification of the workpiece is not attached to the workpiece transfer unit 10, the process is returned to step S71. In steps S75–S78, the reference similar to that described above is performed against the next and last workpiece transfer units 10** in turn.

When it is confirmed that "Wn#" in any steps S74, S76 and S78, the process is advanced to steps S79–S83. In this process, it is judged whether the machining operation is or not performed at the present address of the workpiece transfer unit 10 with reference to the machining process table MKT, if so, it is referred wirelessly to the CNC unit 51 on the top workpiece transfer unit 10 that the machining program is completed or is not completed. As the result of the reference, when it is confirmed that the machining program is not completed, the present address information and the command that a spindle drive flag is turned to "ON" are given to the spindle driving unit 193** in step S84.

The spindle driving unit 193, hereby, maintains the spindle drive flag corresponding to the present address to be "ON", and the rotation of the driving motor 65 of the spindle head 60 corresponding to the present address is maintained while the spindle drive flag is in a "ON" state.

To the contrary, in a case that the machining operation is completed at the present address, the present address information and the command that the spindle drive flag is turned to "OFF" are given to the spindle drive unit 193 in step S81. With this operation, the power supply to the driving motor 65 of the spindle head 60 corresponding to the present address is stopped, so that the driving motor 65 and the tool spindle 66 is naturally stopped.

On the other hand, it may be judged in step S79 that no machining operation exists at the present address. Characteristically, as shown in FIG. 15, it is a case that each of the workpiece transfer unit 10 reaches at the workpiece temporary table 169*b* of the starting end address "01" of the forward machining line 100 or at the workpiece temporary table 169*c* of the starting end address "N" of the backward machining line 101, or that the workpiece transfer unit 10 merely passes at the front of the spindle head 60 in which the machining operation is not planed in the NC program NCP.

In this case, the process advances to step S82, a next indexed address for the workpiece transfer unit 10 to perform a next machining operation is read out from the machining process table MKT in FIG. 18 based upon the information of the workpiece classification number "Wn", and the command specified by the information of the workpiece classification number "Wn" and the next indexed address is supplied to the spindle drive unit 193. With this command, the spindle drive unit 193 sets the spindle drive flag specified by the information of the next indexed address to "ON", and the power is supplied to the driving motor 65 specified by the spindle drive flag.

Accordingly, the driving motor 65 of the spindle head 60 designated by the next indexed address is operated at the same time when the machining operation at the previous indexed position is generally completed, so that its rotation is gradually increased, whereby it attains the rotation necessary for the machining operation until the workpiece transfer unit 10 reaches at the front of the next indexed position.

Thus, the spindle head 60 indexed for the machining operation in each of the workpiece transfer units 10 is operated when the machining operation in the previous process is generally finished. Successively, it is judged whether such a process is or not performed about the last workpiece transfer unit 10 traveling on own machining line (step S85). In this situation, when it is confirmed that the process is finished about the last workpiece transfer unit 10, the spindle control program is completed.

Second Embodiment

Figure 20:
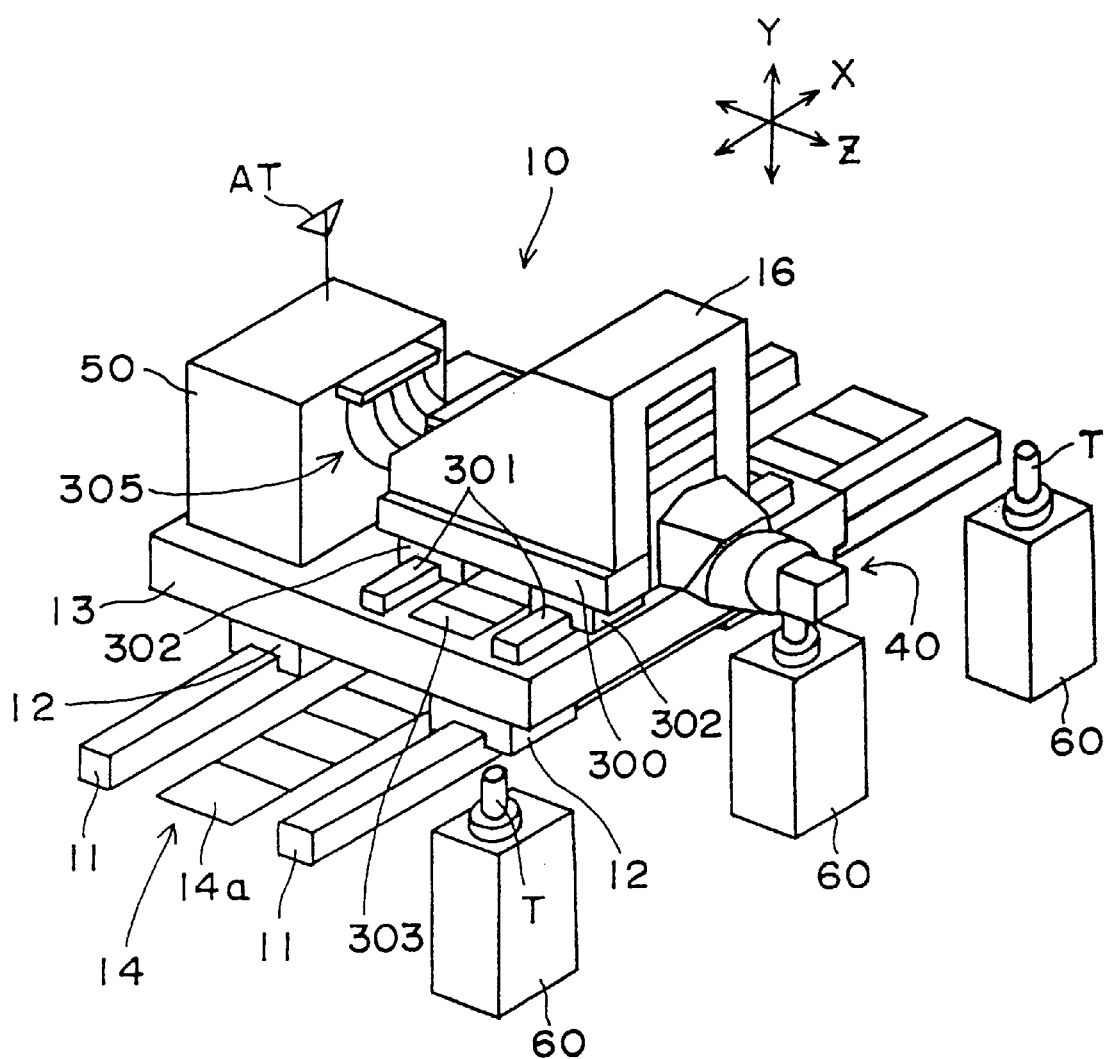
FIG. 20 is a perspective view showing a workpiece transfer unit of a second embodiment according to the present invention.

FIG. 20 shows a second embodiment according to the present invention with respect to the workpiece transfer unit 10. In this embodiment, the unit controller 50 is mounted at a rear side of the traveling member (the first movable member) 13, in the front of which a sub-movable member 300 is slidably guided in the first horizontal direction (X-axis direction) thereon. Further, on the sub-movable member 300, the second movable member 16 is slidably guided in the second horizontal direction (Z-axis direction).

In more detail, a pair of sub-straight rails 301 separately from each other in the Z-axis direction are fixedly provided on a front upper surface of the first movable member 13, in which four bearing blocks 302 are secured to four corners of a lower surface of the sub-movable member 300 to be movable along with the sub-straight rails 301. Between the sub-straight rails 301, there is formed a linear motor composed of plural magnet plates 303 fixed on the traveling member 13, and a moving coil (not shown) on the lower surface of the sub-movable member 300, to move it in the X-axis direction. On the sub-movable member 300, the guide mechanism and the feed mechanism in the Z-axis direction are configured similar to that described in the first embodiment.

In this embodiment, a CNC unit (not shown) provided in each of the unit controllers 50 controls the linear motor 14 to index its workpiece transfer unit 10 in the X-axis direction to the front of each of the spindle heads 60. Further, at each of the indexed positions, the feed movement in X-axis direction is applied with the linear motor including the plural magnet plates 303 for machining the workpiece.

By this construction as described above, a linear motor of a high resolution type is used as that of the feed mechanism in the X-axis direction for the machining operation, while an economical and high speed linear motor of a low resolution type is used as the linear motor 14 for moving the traveling member 13 between the spindle heads 60. During the machining operation performed at the front of each of the spindle heads 60, the unit controller 50 is not moved, so that feed rates in the machining operation can be increased. In such a configuration, ordinary power lines 305 can be used in the communication of the unit controller 50 with each of the servomotors, and conventional flexible pipes can be also used for connecting a hydraulic pump unit provided in the unit controller 50 with each of hydraulic actuators.

In the second embodiment, the feed mechanism for the sub-movable member 300 is constructed with the linear motor including the magnet plates 303. However, except for the linear motor, it may be adopted such a feed mechanism of a ball screw type driven by a conventional servomotor.

Third Embodiment

Figure 21:
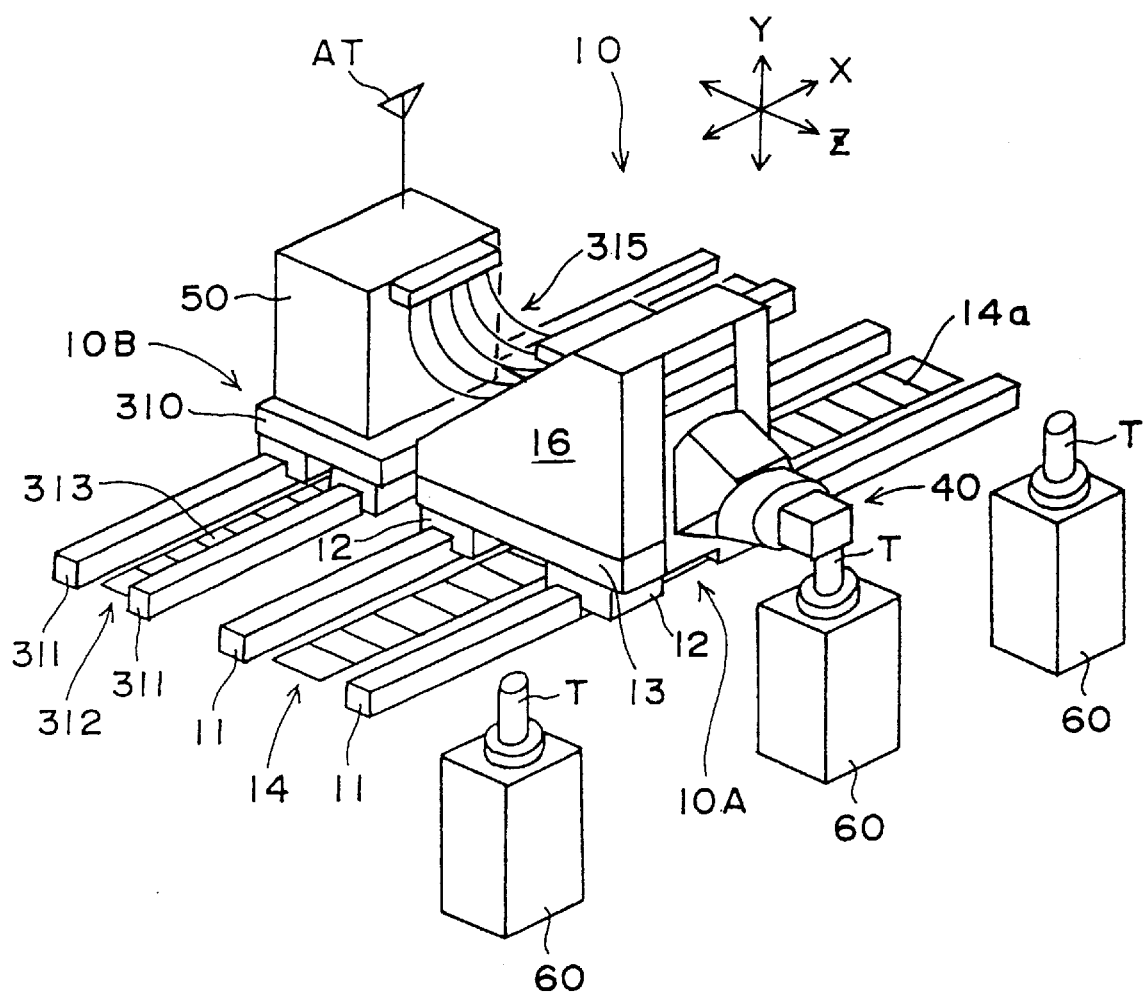
FIG. 21 is a perspective view showing a workpiece transfer unit of a third embodiment according to the present invention.

FIG. 21 shows a third embodiment with respect to the workpiece transfer unit 10, in which it is composed of a main-transfer unit 10A and a sub-transfer unit 10B. The sub-transfer unit 10B on which the unit controller 50 is mounted is arranged on each of the machining lines 100 and 101 separately with the traveling member (the movable member) 13 of the main-transfer unit 10A and however, is moved in the first horizontal direction with the transfer movement of the main-transfer unit 10A.

In detail, the rear upper surface 2 of the line base 1 in each of the machining lines 100 and 101 is enlarged in the width in the Z-axis direction. On a front side of the rear upper surface 2, the traveling member (the movable member) 13 movable in the X-axis direction is provided similar to that of the first embodiment. On the other hand, a sub-traveling member 310 movable in the X-axis direction is provided on a rear side of the rear upper surface 2, which construction is generally similar to that of the traveling member 13. Between a pair of straight rails 311 for slidably guiding the sub-traveling member 310 which rails extend parallel with the X-axis direction, there are fixed mounted plural magnet plates 313 similarly to that of linear motor 14 for driving the traveling member 13, in which a linear motor 312 is constructed with the magnet plates 313 and a moving coil (not shown) provided on a lower surface of the sub-traveling member 310.

In this embodiment, the CNC unit, PLC and hydraulic pump unit (not shown) provided in the unit controller 50 on the sub-transfer unit 10B are connected with control devices corresponding thereto mounted on the main-transfer unit 10A, by ordinary power lines and flexible pipes. In this embodiment, the power supply line supporting device 56 and the trolley mechanism 55 shown in FIG. 5 according to the first embodiment, are provided on a back surface of the enlarged rear upper surface 2 in each of the machining lines and on a rear lower surface of the sub-traveling member 310, respectively. With this construction, the electric power can be supplied to the unit controller 50 on the sub-transfer unit 10B.

In a case that the workpiece transfer unit 10 is indexed at the front of the objective spindle head 60 in accordance with machining program, the CNC unit in the unit controller 50 concurrently supplies identical commands with the linear motors 14 and 312. According to this command, the main-transfer unit 10A and the sub-transfer unit 10B are simultaneously infed in the X-axis direction. In contemplation of the simultaneous feed error between the both transfer units 10A and 10B, it is preferred that the both transfer units 10A and 10B are connected with each other by a flexible element such a coil spring.

Further, during the machining operation performed in the front of the objective spindle head 60, the sub-transfer unit 10B is held at the indexed position by servo-locking the linear motor 312 for driving the sub-transfer unit 10B. On the contrary, the CNC unit of the unit controller 50 controls according to the machining program, each of the linear motor 14 for infeeding the main-transfer unit 10A in the X-axis direction, and the servomotors for the movable members mounted on the same unit 10A (i.e., servomotors 21, 30, 47 and 48 for respectively driving the second and third movable members 16 and 27, and the first and second index tables 41 and 42, as explained in the first embodiment).

In this embodiment, a rear portion in each of bases for the waiting station 130 and the repairing station 140, is enlarged in the Z-axis direction similarly to that in each of the machining lines 100 and 101. In the enlarged portion, a pair of straight rails (not shown) for slidably guiding the sub-transfer unit 10B are provided on an upper surface of the enlarged portion, and plural magnet plates are laid between the straight rails to form a linear motor for driving the sub-transfer unit 10B on each of the waiting station 130 and the repairing station 140.

Similarly to the modification in the line base 1, length in the traveling direction (the Z-axis direction) is enlarged in each of the automatic guided vehicles AGV1 and AGV2, in which a pair of straight rails are provided on an upper surface of the enlarged portion for guiding the sub-transfer unit 10B. Further, another loading mechanism similar to the loading mechanism 200 shown in FIG. 8 is formed between the straight rails on each of the automatic guided vehicles AGV1 and AGV2.

According to the workpiece transfer unit 10 in the third embodiment, the sub-transfer unit 10B is not followed with the movement of the main-transfer unit 10A in the X-axis direction during the machining operation performed at the front of the objective spindle head 60, so that the main-transfer unit 10A can be lightened as a whole. Therefore, the machining operation can be performed with a high speed and a high positioning accuracy.

Figure 22:
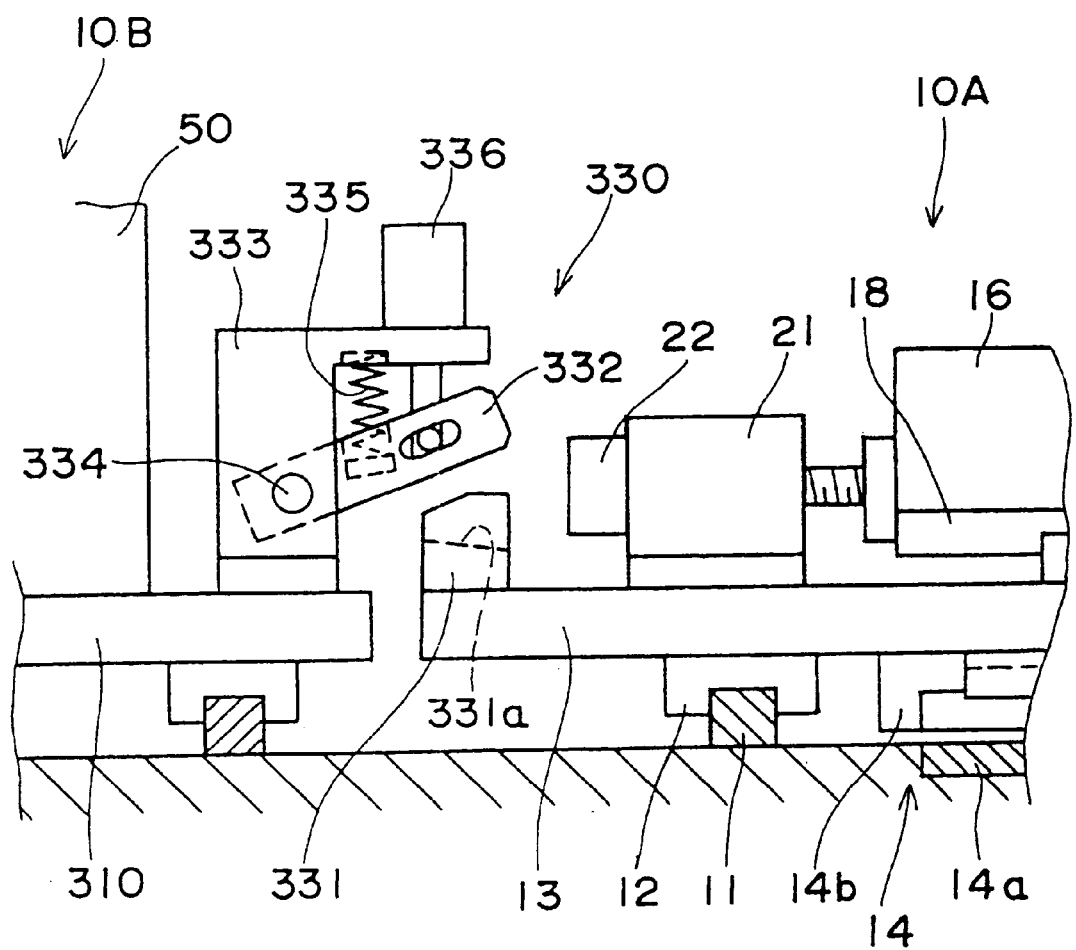
FIG. 22 is an elevational explanation view showing a mechanical connection mechanism used in the workpiece transfer unit according to the third embodiment of the present invention.

FIG. 22 shows a mechanical connection device 330 used for connecting the main-transfer unit 10A with the sub-transfer unit 10B with respect to a modification of the third embodiment described above. The mechanical connection device 330 is composed of a yoke 331 in the form of U-letter and a connection joint 332, wherein the yoke 331 is fixedly provided at a rear central portion of the traveling member (the first movable member) 13. At a center portion of the yoke 331, a center groove 331a is formed in which a top portion of the connection joint 332 is engaged and released therewith. Further, the connection joint 332 is pivotably supported with a hinge 334 provided in a connection joint support 333 arranged on a front portion of the sub-transfer unit 310. Usually, the connection joint 332 is engaged with the center groove 331a of the yoke 331 by a compressed spring 335 and however, it is released from the center groove 331a with a solenoid 336 lifting the connection joint 332 against the spring force of the compressed spring 335.

In this modification, only while the main-transfer unit 10A independently moves for the machining operation in the X-axis direction at the front of the objective spindle heads, the engagement of the connection joint 332 with the yoke 331 is released upon operation of the solenoid 336. In other words, the connection relationship in the X-axis direction between the main-transfer unit 10A and the sub-transfer unit 10B is maintained while the workpiece transfer unit 10 is transferred at a high speed on each of the machining lines 100 and 101, is mounted on each of automatic guided vehicles AGV1 and AGV2, and is loaded to each of the waiting station 130 and the repairing station 140.

Thus, in this modification, on each of the machining line 100 and 101, the waiting station 130 and the repairing station 140, the linear motor 14 can be used not only for driving the main-transfer unit 10A but also for driving the sub-transfer unit 10B. Therefore, the aforementioned linear motor 312 for the sub-transfer unit 10B can be omitted. With this modification, two of the loading mechanism 200 arranged on each of the automatic guided vehicles AGV1 and AGV2 can be reduced to only one of the loading mechanism 200, so that an additional loading mechanism required in the third embodiment can be eliminated. This advantage induces not only to reduce the manufacturing cost but also to be controllable easily in the entire system.

In the second embodiment shown in FIG. 20, the linear motor 14 is used for driving the traveling member 13 on each of the machining lines 100 and 101, the waiting station 130 and the repairing station 140. However, in place of the linear motor 14, it can be adopted such a chain type feed mechanism, a rack and pinion mechanism, and a friction wheel type feed mechanism and the like. This substitution for the linear motor 14 can be similarly applied to the feed mechanism of the sub-transfer unit 10B shown in FIG. 21. Particularly, in the modification shown in FIG. 22 in which the connection mechanism 330 is provided, during the traveling operation on each of the machining lines 100 and 101, only the sub-transfer unit 10B may be driven in a state that the main-transfer unit 10A is connected with the sub-transfer unit 10B.

Further, the X-axis direction feed mechanism of the workpiece transfer unit 10 described in each of the aforementioned embodiments, in place of the linear motor, can be replaced with that as disclosed in Japanese Patent Publication No. 7-24681, for example. In the aforementioned Publication, each of the workpiece transfer unit 10 is transited through plural feed mechanisms of a ball screw type serially arranged along the machining line in turn. In such a case, each of the workpiece transfer unit 10 is moved in the X-axis direction on each of the machining lines 100 and 101, by bringing the connection of the workpiece transfer unit 10 with a nut of the ball screw feed mechanism from its nut to another nut of an adjacent ball screw feed mechanism thereto. In this configuration described hereinbefore, a feed range of one ball screw feed mechanism covers a machining range of one the spindle head 60, or that of plural thereof. Further, in a case that the plural ball screw feed mechanisms are arranged in the form of a crank, spaces of motors for driving each of the ball screw feed mechanisms can be obtained. Preferably, in each of the ball screw feed mechanisms, an end portion of a ball screw is overlapped with an end portion of the adjacent ball screw, in which the engagement of the workpiece transfer unit 10 with one of the nuts is transited to the other nut in a condition that the nuts of the both ball screws exist at an overlapped portion of the ball screws. Therefore, each of the workpiece transfer units 10 is transited in the case the two nuts exist at the same position in the X-axis direction, so that the influence of the thermal displacement upon the accuracy in X-axis direction can be reduced in comparison with a case that the feed mechanism in X-axis direction is composed of only one ball screw.

In place of the ball screw feed mechanisms for the second and third movable members 16 and 27, linear motors can be used therefor. Further, if a machined surface of the workpiece Wp attached to the workpiece transfer unit 10 through the pallet P is limited (e.g., only a lower surface of the workpiece Wp is machined), it is possible to eliminate the first index table 41 and its indexing mechanism and/or the second index table 42 and its indexing mechanism. In this case, it may be adopted that the pallet P can be directly attached to the third movable member 27 and removed therefrom.

In the embodiments, the trolley mechanism and the wireless communication are adopted for the power supply to each of the unit controllers 50, the communication between its unit controller 50 and the main control unit 180, respectively. However, diverse configurations are adopted in place of the trolley mechanism and the wireless communication. For example, the electric power and the command signals can be supplied with a wired communication to the unit controller 50 traveling on each of the machining lines 100 and 101, by such a device that can automatically attach and remove the power and command signal lines to and from the unit controller 50 at the starting and finishing points of each of the machining lines, or at the starting and finishing points of each of sections to which each of the machining lines is divided.

As another configuration, on the floor along each of the machining lines, there are fixedly provided the same number of the unit controllers 50 as the number of the workpiece transfer units 10 concurrently traveling on each of the machining lines. In this configuration, the unit controller 50 is wire-communicated with the main control unit 180. Further, as described above, the electric power and command signals may be supplied to a terminal box of the workpiece transfer unit 10, by providing the automatic attachable device for the power and command signal lines.

Further, the second and third movable member 16 and 27 is so constructed to move the workpiece Wp in the Y-Z plane with a rectangular coordinates system, and also a rotational coordinates system (or a polar coordinates system) can be used for moving the workpiece Wp in the Y-Z plane in place thereof. In this case, a first rotational member is rotatably provided on the first movable member 13 around an axis parallel with the X-axis direction wherein a second rotational member is rotatably supported. Further, the workpiece supporting device 40 is provided on an eccentric portion of the second rotational member, so that it can be moved in the Y-Z plane in combination of the rotational movement of the first rotational member with that of the second rotational member.

In the first embodiment, the unit number control function is provided in the main control unit 180 wherein it is so controlled that the number of the workpiece transfer unit 10 does not exceed the predetermined number by renewing the unit location table ULT to which the workpiece transfer unit 10 input in each of machining lines 100 and 101 is memorized. Such a function of the main control unit 180 may be performed in the PLC 120 for controlling the automatic guide vehicles AGV1 and AGV2, and so on. Namely, a counter is arranged at the starting point of the each of the machining lines for counting the accumulation unit number inputted thereto, and another counter is also arranged at the finishing point thereof for the accumulation unit number of that outputted therefrom. In such a situation, the program in the PLC 120 controls the system so that the difference between two of the accumulation unit number does not exceed the predetermined number.

Further, the unit interval control function may be executed in not the main control unit 180 of the aforementioned first embodiment in but the unit controller 50 provided on each of the workpiece transfer units 10. In this modification, each of the unit controller 50 of the workpiece transfer unit 10 informs to each other its present position on each of the machining lines 100 and 101 between each of the unit controller 50, in which the control program in the unit controller 50 controls so that the unit interval distance between the adjacent two of workpiece transfer units 10 is so maintained to be the predetermined interval distance.

Further, it may be so constructed that the tool spindle drive control unit 190a shown in FIG. 17 receives the next address information of the objective spindle head 60 from the CNC unit 51 of the workpiece transfer unit 10 traveling on each of the machining lines 100 and 101, at the time when the machining operation is finished at the front of its spindle head 60 and that the driving motor 65 rotates merely the spindle head 60 designated by the address information. In this modification, the CNC unit 51 provided in each of the workpiece transfer units 10 searches the next address information of the objective spindle head 60 defined in the NC program NCP at each time of that its workpiece transfer unit 10 reaches at the front of one of the objective spindle heads 60, and the next address information of the objective spindle head 60 is transmitted to the tool spindle drive control unit 191a at the same time when it is started to transfer the workpiece transfer unit 10 to the next objective spindle head 60.

Obviously, numerous modifications and variations of the present invention are possible in light of the above teachings. It is therefore to be understood that within the scope of the appended claims, the present invention may be practiced otherwise than as specifically described herein.

What is claimed is:

1. A flexible manufacturing system comprising:

at least one base serving as a machining line and extending along a transferred direction of a workpiece;

a guideway formed on said base in a first horizontal direction parallel with a longitudinal direction of said base;

plural spindle heads arranged at predetermined intervals in the first horizontal direction, said spindle head is so configured that a tool spindle is rotatably supported by a motor to a top end portion of which a tool is secured;

plural workpiece transfer units movably guided on said guideway of said machining line at the same time in which the workpiece to be machined is supported, each of said workpiece transfer units comprising:

a first feed mechanism for independently feeding each of said plural workpiece transfer units in the first horizontal direction;

a traveling member provided in each of said plural workpiece transfer units and guided with said guideway, said traveling member being movable in the first horizontal direction by said first feed mechanism;

a workpiece supporting device provided on each of said traveling members to hold the workpiece to be machined;

a guide mechanism provided on each of said movable members to feed said workpiece supporting device in two other directions different from the first horizontal direction; and second and third feed mechanisms provided on each of said traveling members for feeding said workpiece supporting device in said two other directions along said guide mechanisms; and a control unit according to a control program stored therein for indexing each of said plural workpiece transfer units to the front of at least some of said spindle heads and for feeding at least one of said first, second and third feed mechanisms in at least one of said first horizontal direction and said two other directions, to machine the workpiece positioned at the front of said spindle head by moving said workpiece supporting device;

wherein each of said workpiece transfer units is sequentially input from a starting end of said machining line and is sequentially output from a finishing end thereof so as to substantially move in one direction of said first horizontal direction.

2. A flexible manufacturing system according to claim 1, wherein said machining line is defined as a forward machining line, said system further comprising:

a backward machining line provided on another base arranged parallel with said forward machining line;

a first unit transfer device provided at one end side of said forward and backward machining line; and a second unit transfer device provided at the other end side of said forward and backward machining lines; wherein each of said workpiece transfer units output from a finishing end of said backward machining line is input into the starting end of said forward machining line by said first unit transfer device again; and wherein each of said workpiece transfer units output from the finishing end of said forward machining line is input to a starting end of said backward machining line by said second unit transfer device.

3. A flexible manufacturing system according to claim 2, further comprising:

a workpiece temporary table provided at each of the starting and finishing ends of said forward and backward machining lines, the workpiece being loaded and placed on said workpiece temporary table by said workpiece supporting device; and a workpiece supply device provided in said flexible manufacturing system for supplying the unmachined workpiece to said workpiece temporary table arranged at the starting end of each of said forward and backward machining lines, and for removing the machined workpiece from said workpiece temporary table arranged at each of the finishing end thereof.

4. A flexible manufacturing system according to claim 2, wherein said first and second unit transfer devices are respectively composed of first and second automatic guided vehicles movable in the first horizontal direction, on each of which a guideway of substantially same construction as that provided on each of said machining lines is formed and which a loading mechanism is provided for loading said workpiece transfer unit positioned at the end portion of the machining line thereon with the engagement of said workpiece transfer unit and for releasing said workpiece transfer unit to the machining line mounted on said automatic guided vehicle when said automatic guided vehicle is brought alongside of said machining line, said flexible manufacturing system further comprising:

a waiting station for waiting said workpiece transfer unit, provided at an opposite side to said machining line along the traveling course of said first automatic guided vehicle, said waiting station being composed of a waiting base extending in said first horizontal direction and a guideway same construction as that provided on said machining line for slidably guiding said workpiece transfer unit, wherein said loading mechanism on said first automatic guided vehicle loads said workpiece transfer unit existing at an end portion of said waiting station on said first automatic guided vehicle, and releases said workpiece transfer unit mounted on said automatic guided vehicle to said waiting station, when said first automatic guided vehicle is brought alongside of said waiting station.

5. A flexible manufacturing system according to claim 4, further comprising:

a repairing station provided parallel with said waiting station along the traveling course of said first automatic guided vehicle, on which a guideway substantially same as that provided on said waiting station is formed parallel with the guideway of said waiting station, workpiece loading-releasing control means, said loading mechanism on said first automatic guided vehicle loading said workpiece transfer unit existing at an end portion of said repairing station on said first automatic guided vehicle, and releasing said workpiece transfer unit mounted on said automatic guided vehicle to said repairing station, when said first automatic guided vehicle is brought alongside of said waiting station, wherein said repairing station is functioned as an escaping station by temporarily receiving said workpiece transfer unit output from said waiting station.

6. A flexible manufacturing system according to claim 4, further comprising:

a tool changer guideway extending in said first horizontal direction provided on each of said bases of said machining lines, and provided on said first automatic guided vehicle, said tool changer guideways provided on said base and said first automatic guided vehicle being aligned with each other when said first automatic guided vehicle is indexed to said machining line;

a tool storage magazine provided along the traveling course of said first automatic guided vehicle; and a self-propelled tool changer traveling along said tool changer guideways provided on said base of said machining line and said first automatic guided vehicle, for transferring the tool between said tool storage magazine and said spindle head of said machining line to change the tool to said tool spindle.

7. A flexible manufacturing system according to claim 1, said control unit further comprising:

a unit number control means for controlling so that a number of said workpiece transfer unit concurrently used on said machining line is kept within a predetermined number.

8. A flexible manufacturing system according to claim 1, said control unit further comprising:

a unit interval control means for controlling so that an interval of said workpiece transfer unit concurrently used on said machining line is kept beyond a predetermined interval.

9. A flexible manufacturing system according to claim 1, said control unit further comprising:

a unit controller mounted on each of said workpiece transfer unit, and said flexible manufacturing system further comprising:

a power supply means for supplying the electric power to each of said unit controller, said power supply means being composed of power lines provided parallel with said base of each of said machining lines and a trolley mechanism provide on each of said workpiece transfer units for contacting said unit controller with the power lines through a contact element while said workpiece transfer unit travels on said machining line.

* * * * *